United States Patent
Sorrells et al.

(10) Patent No.: US 9,419,692 B2
(45) Date of Patent: Aug. 16, 2016

(54) ANTENNA CONTROL

(71) Applicant: ParkerVision, Inc., Jacksonville, FL (US)

(72) Inventors: David F. Sorrells, Middleburg, FL (US); Gregory S. Rawlins, Heathrow, FL (US)

(73) Assignee: ParkerVision, Inc., Jacksonville, FL (US)

( * ) Notice: Subject to any disclaimer, the term of this patent is extended or adjusted under 35 U.S.C. 154(b) by 0 days.

(21) Appl. No.: 14/264,155

(22) Filed: Apr. 29, 2014

(65) Prior Publication Data

US 2015/0288431 A1 Oct. 8, 2015

Related U.S. Application Data

(63) Continuation of application No. 13/487,956, filed on Jun. 4, 2012, now Pat. No. 8,755,454.

(60) Provisional application No. 61/492,576, filed on Jun. 2, 2011.

(51) Int. Cl.
*H04B 7/04* (2006.01)
*H04B 1/04* (2006.01)
*H04B 7/06* (2006.01)
*H01Q 3/26* (2006.01)
(Continued)

(52) U.S. Cl.
CPC .............. *H04B 7/0413* (2013.01); *H01Q 3/267* (2013.01); *H01Q 21/061* (2013.01); *H04B 1/04* (2013.01); *H04B 1/0483* (2013.01); *H04B 7/0621* (2013.01); *H04B 17/12* (2015.01); *H04B 7/10* (2013.01); *H04W 52/42* (2013.01)

(58) Field of Classification Search
USPC ................... 375/295, 345; 370/328; 330/127
See application file for complete search history.

(56) References Cited

U.S. PATENT DOCUMENTS

| 1,882,119 A | 10/1932 | Chireix |
| 1,946,308 A | 2/1934 | Chireix |

(Continued)

FOREIGN PATENT DOCUMENTS

| EP | 0 011 464 A2 | 5/1980 |
| EP | 0 471 346 A1 | 8/1990 |

(Continued)

OTHER PUBLICATIONS

Complaint, filed Dec. 28, 2011, in the United States District Court, District of New Jersey, *Maxtak Capital Advisors LLC et al.* v. *ParkerVision, Inc. et al.*, Case No. 2:11-cv-07549-CCC-JAD, 63 pages.

(Continued)

*Primary Examiner* — Eva Puente
(74) *Attorney, Agent, or Firm* — Thomas F. Presson

(57) ABSTRACT

An apparatus, method and system for transmission are described herein. For example, apparatus can include a synthesis engine, a power supply and a multiple input single output (MISO) operator. The synthesis engine is configured to generate amplitude control signals, phase control signals and power supply control signals based on command and control information. The power supply is configured to receive the power supply control signals and to generate a power supply signal. Further, the MISO operator is configured to generate an output signal with an amplitude or a phase controlled by at least one of the amplitude control signals, the phase control signals and the power supply signal.

17 Claims, 19 Drawing Sheets

(51) Int. Cl.
*H01Q 21/06* (2006.01)
*H04B 17/12* (2015.01)
*H04B 7/10* (2006.01)
*H04W 52/42* (2009.01)

(56) References Cited

U.S. PATENT DOCUMENTS

| | | |
|---|---|---|
| 2,116,667 A | 5/1938 | Chireix |
| 2,210,028 A | 8/1940 | Doherty |
| 2,220,201 A | 11/1940 | Bliss |
| 2,269,518 A | 1/1942 | Chireix et al. |
| 2,282,706 A | 5/1942 | Chireix et al. |
| 2,282,714 A | 5/1942 | Fagot |
| 2,294,800 A | 9/1942 | Price |
| 2,508,524 A | 5/1950 | Lang |
| 2,529,073 A | 11/1950 | Chireix |
| 2,555,039 A | 5/1951 | Bissonette |
| 2,591,749 A | 4/1952 | Villemagne |
| 2,670,404 A | 2/1954 | Chireix |
| 2,677,806 A | 5/1954 | Chireix |
| 2,714,634 A | 8/1955 | Hall |
| 2,734,100 A | 2/1956 | Kendall |
| 2,857,591 A | 10/1958 | Nagel |
| 2,890,280 A | 6/1959 | Feyzean |
| 2,908,753 A | 10/1959 | Ernyei et al. |
| 2,938,945 A | 5/1960 | France |
| 2,963,933 A | 12/1960 | Bereskin |
| 2,964,622 A | 12/1960 | Fire |
| 2,968,697 A | 1/1961 | Rager, Jr. |
| 3,056,017 A | 9/1962 | Peras |
| 3,078,456 A | 2/1963 | Alpers |
| 3,121,198 A | 2/1964 | Potter |
| 3,154,782 A | 10/1964 | Kagawa et al. |
| 3,170,127 A | 2/1965 | Cramer |
| 3,176,060 A | 3/1965 | Bissonette et al. |
| 3,212,008 A | 10/1965 | Kahn |
| 3,219,862 A | 11/1965 | Kieffert |
| 3,263,019 A | 7/1966 | Hurvitz |
| 3,341,697 A | 9/1967 | Kaufman et al. |
| 3,413,570 A | 11/1968 | Bruene et al. |
| 3,418,595 A | 12/1968 | Loewenstern, Jr. |
| 3,436,686 A | 4/1969 | Vackar |
| 3,437,945 A | 4/1969 | Duncan |
| 3,458,816 A | 7/1969 | O'Brien |
| 3,493,718 A | 2/1970 | Kestner et al. |
| 3,513,352 A | 5/1970 | Souillard |
| 3,525,941 A | 8/1970 | Smith |
| 3,544,697 A | 12/1970 | Munch, Jr. |
| 3,651,429 A | 3/1972 | Ruthroff |
| 3,697,692 A | 10/1972 | Hafler |
| 3,716,730 A | 2/1973 | Cerny, Jr. |
| 3,777,275 A | 12/1973 | Cox |
| 3,789,314 A | 1/1974 | Beurrier |
| 3,815,040 A | 6/1974 | Seidel |
| 3,852,530 A | 12/1974 | Shen |
| 3,852,669 A | 12/1974 | Bowman et al. |
| 3,895,304 A | 7/1975 | Klein |
| 3,896,395 A | 7/1975 | Cox |
| 3,906,390 A | 9/1975 | Rollett |
| 3,909,742 A | 9/1975 | Cox et al. |
| 3,927,379 A | 12/1975 | Cox et al. |
| 3,936,819 A | 2/1976 | Angelle et al. |
| 3,991,343 A | 11/1976 | Delpy |
| 4,090,147 A | 5/1978 | Seidel |
| 4,095,196 A | 6/1978 | Seidel |
| 4,104,946 A | 8/1978 | Peterson |
| 4,151,517 A | 4/1979 | Kelley |
| 4,178,557 A | 12/1979 | Henry |
| 4,229,715 A | 10/1980 | Henry |
| 4,301,490 A | 11/1981 | Nagel et al. |
| 4,346,354 A | 8/1982 | Hanna |
| 4,378,530 A | 3/1983 | Garde |
| 4,433,312 A | 2/1984 | Kahn |
| 4,439,744 A | 3/1984 | Kumar et al. |
| 4,441,080 A | 4/1984 | Saari |
| 4,446,440 A | 5/1984 | Bell |
| 4,485,357 A | 11/1984 | Voorman |
| 4,509,017 A | 4/1985 | Andren et al. |
| 4,511,813 A | 4/1985 | Pan |
| 4,580,111 A | 4/1986 | Swanson |
| 4,584,541 A | 4/1986 | Nossen |
| 4,605,902 A | 8/1986 | Harrington |
| 4,628,286 A | 12/1986 | Nossen |
| 4,682,119 A | 7/1987 | Michel |
| 4,682,149 A | 7/1987 | Larson |
| 4,686,448 A | 8/1987 | Jones et al. |
| 4,687,999 A | 8/1987 | Desperben et al. |
| 4,701,716 A | 10/1987 | Poole |
| 4,717,894 A | 1/1988 | Edwards et al. |
| 4,743,858 A | 5/1988 | Everard |
| 4,780,803 A | 10/1988 | Dede Garcia-Santamaria |
| 4,816,783 A | 3/1989 | Leitch |
| 4,817,116 A | 3/1989 | Akaiwa et al. |
| 4,873,492 A | 10/1989 | Myer |
| 4,951,303 A | 8/1990 | Larson |
| 4,974,236 A | 11/1990 | Gurcan et al. |
| 4,995,055 A | 2/1991 | Weinberger et al. |
| 5,005,419 A | 4/1991 | O'Donnell et al. |
| 5,012,200 A | 4/1991 | Meinzer |
| 5,017,888 A | 5/1991 | Meinzer |
| 5,077,539 A | 12/1991 | Howatt |
| 5,081,673 A | 1/1992 | Engelke et al. |
| 5,093,636 A | 3/1992 | Higgins, Jr. et al. |
| 5,115,203 A | 5/1992 | Krett et al. |
| 5,124,665 A | 6/1992 | McGann |
| 5,164,678 A | 11/1992 | Puri et al. |
| 5,214,670 A | 5/1993 | Ballatore |
| 5,229,735 A | 7/1993 | Quan |
| 5,239,275 A | 8/1993 | Leitch |
| 5,239,686 A | 8/1993 | Downey |
| 5,264,807 A | 11/1993 | Okubo et al. |
| 5,287,069 A | 2/1994 | Okubo et al. |
| 5,302,914 A | 4/1994 | Arntz et al. |
| 5,304,943 A | 4/1994 | Koontz |
| 5,307,069 A | 4/1994 | Evans |
| 5,345,189 A | 9/1994 | Hornak et al. |
| 5,351,288 A | 9/1994 | Engelke et al. |
| 5,365,187 A | 11/1994 | Hornak et al. |
| 5,365,190 A | 11/1994 | Yu et al. |
| 5,404,114 A | 4/1995 | Sager |
| 5,410,280 A | 4/1995 | Linguet et al. |
| 5,420,541 A | 5/1995 | Upton et al. |
| 5,426,641 A | 6/1995 | Afrashteh et al. |
| 5,432,473 A | 7/1995 | Mattila et al. |
| 5,438,591 A | 8/1995 | Oie et al. |
| 5,438,684 A | 8/1995 | Schwent et al. |
| 5,485,120 A | 1/1996 | Anvari |
| 5,490,172 A | 2/1996 | Komara |
| 5,495,500 A | 2/1996 | Jovanovich et al. |
| 5,508,657 A | 4/1996 | Behan |
| 5,515,068 A | 5/1996 | Uragami et al. |
| 5,530,722 A | 6/1996 | Dent |
| 5,541,554 A | 7/1996 | Stengel et al. |
| 5,554,865 A | 9/1996 | Larson |
| 5,559,471 A | 9/1996 | Black |
| 5,568,088 A | 10/1996 | Dent et al. |
| 5,574,967 A | 11/1996 | Dent et al. |
| 5,574,992 A | 11/1996 | Cygan et al. |
| 5,612,651 A | 3/1997 | Chethik |
| 5,621,351 A | 4/1997 | Puri et al. |
| 5,631,604 A | 5/1997 | Dent et al. |
| RE35,536 E | 6/1997 | Irissou et al. |
| 5,638,024 A | 6/1997 | Dent et al. |
| 5,678,208 A | 10/1997 | Kowalewski et al. |
| 5,694,433 A | 12/1997 | Dent |
| 5,697,074 A | 12/1997 | Makikallio et al. |
| 5,710,520 A | 1/1998 | Frey |
| 5,719,527 A | 2/1998 | Bateman et al. |
| 5,724,005 A | 3/1998 | Chen et al. |
| 5,732,334 A | 3/1998 | Miyake |
| 5,739,723 A | 4/1998 | Sigmon et al. |
| 5,757,229 A | 5/1998 | Mitzlaff |
| 5,764,704 A | 6/1998 | Shenoi |
| 5,767,750 A | 6/1998 | Yamaji |

(56) References Cited

U.S. PATENT DOCUMENTS

| | | |
|---|---|---|
| 5,770,971 A | 6/1998 | McNicol |
| 5,784,412 A | 7/1998 | Ichihara |
| 5,784,689 A | 7/1998 | Kobayashi |
| 5,786,727 A | 7/1998 | Sigmon |
| 5,792,956 A | 8/1998 | Li |
| 5,805,640 A | 9/1998 | O'Dea et al. |
| 5,815,531 A | 9/1998 | Dent |
| 5,835,128 A | 11/1998 | Macdonald et al. |
| 5,841,876 A | 11/1998 | Gifford et al. |
| 5,854,571 A | 12/1998 | Pinckley et al. |
| 5,862,460 A | 1/1999 | Rich |
| 5,872,481 A | 2/1999 | Sevic et al. |
| 5,877,643 A | 3/1999 | Drogi |
| 5,880,633 A | 3/1999 | Leizerovich et al. |
| 5,886,573 A | 3/1999 | Kolanek |
| 5,886,575 A | 3/1999 | Long |
| 5,890,051 A | 3/1999 | Schlang et al. |
| 5,892,394 A | 4/1999 | Wu |
| 5,892,395 A | 4/1999 | Stengel et al. |
| 5,901,346 A | 5/1999 | Stengel et al. |
| 5,903,854 A | 5/1999 | Abe et al. |
| 5,933,766 A | 8/1999 | Dent |
| 5,949,283 A | 9/1999 | Proctor et al. |
| 5,952,947 A | 9/1999 | Nussbaum et al. |
| 5,956,097 A | 9/1999 | Nguyen et al. |
| 5,963,091 A | 10/1999 | Chen et al. |
| 5,973,559 A | 10/1999 | Alberty |
| 5,973,568 A | 10/1999 | Shapiro et al. |
| 5,974,041 A | 10/1999 | Kornfeld et al. |
| 5,990,738 A | 11/1999 | Wright et al. |
| 5,999,046 A | 12/1999 | Kotzamanis |
| 6,011,830 A | 1/2000 | Sasin et al. |
| 6,026,286 A | 2/2000 | Long |
| 6,028,485 A | 2/2000 | Sigmon et al. |
| 6,043,707 A | 3/2000 | Budnik |
| 6,054,896 A | 4/2000 | Wright et al. |
| 6,057,798 A | 5/2000 | Burrier et al. |
| 6,069,525 A | 5/2000 | Sevic et al. |
| 6,072,361 A | 6/2000 | Myers et al. |
| 6,085,074 A | 7/2000 | Cygan |
| 6,097,252 A | 8/2000 | Sigmon et al. |
| 6,104,991 A | 8/2000 | Newland et al. |
| 6,111,461 A | 8/2000 | Matsuno |
| 6,111,462 A | 8/2000 | Mucenieks et al. |
| 6,115,368 A | 9/2000 | Schilling |
| 6,125,266 A | 9/2000 | Matero et al. |
| 6,130,910 A | 10/2000 | Anderson et al. |
| 6,130,916 A | 10/2000 | Thomson |
| 6,133,788 A | 10/2000 | Dent |
| 6,133,789 A | 10/2000 | Braithwaite |
| 6,137,355 A | 10/2000 | Sevic et al. |
| 6,147,553 A | 11/2000 | Kolanek |
| 6,154,093 A | 11/2000 | Chen et al. |
| 6,157,253 A | 12/2000 | Sigmon et al. |
| 6,169,455 B1 | 1/2001 | Yamaguchi |
| 6,175,747 B1 | 1/2001 | Tanishima et al. |
| 6,181,199 B1 | 1/2001 | Camp, Jr. et al. |
| 6,188,277 B1 | 2/2001 | Borodulin et al. |
| 6,198,416 B1 | 3/2001 | Velazquez |
| 6,201,452 B1 | 3/2001 | Dent et al. |
| 6,204,735 B1 | 3/2001 | Cairns |
| 6,215,354 B1 | 4/2001 | Kolanek et al. |
| 6,232,838 B1 | 5/2001 | Sugimoto |
| 6,236,688 B1 | 5/2001 | Ohta et al. |
| 6,242,975 B1 | 6/2001 | Eidson et al. |
| 6,246,286 B1 | 6/2001 | Persson |
| 6,246,599 B1 | 6/2001 | Jang et al. |
| 6,252,461 B1 | 6/2001 | Raab |
| 6,256,482 B1 | 7/2001 | Raab |
| 6,259,320 B1 | 7/2001 | Valk et al. |
| 6,285,251 B1 | 9/2001 | Dent et al. |
| 6,292,054 B1 | 9/2001 | Ma et al. |
| 6,295,442 B1 | 9/2001 | Camp, Jr. et al. |
| 6,300,828 B1 | 10/2001 | McInnis |
| 6,304,545 B1 | 10/2001 | Armbruster et al. |
| 6,307,894 B2 | 10/2001 | Eidson et al. |
| 6,311,045 B1 | 10/2001 | Domokos |
| 6,311,046 B1 | 10/2001 | Dent |
| 6,313,703 B1 | 11/2001 | Wright et al. |
| 6,337,599 B2 | 1/2002 | Lee |
| 6,342,812 B1 | 1/2002 | Abdollahian et al. |
| 6,349,216 B1 | 2/2002 | Alberth, Jr. et al. |
| 6,351,189 B1 | 2/2002 | Hirvilampi |
| 6,359,506 B1 | 3/2002 | Camp, Jr. et al. |
| 6,359,508 B1 | 3/2002 | Mucenieks |
| 6,359,513 B1 | 3/2002 | Kuo et al. |
| 6,366,177 B1 | 4/2002 | McCune et al. |
| 6,369,651 B1 | 4/2002 | Dent |
| 6,373,901 B1 | 4/2002 | O'Dea et al. |
| 6,373,902 B1 | 4/2002 | Park et al. |
| 6,374,092 B1 | 4/2002 | Leizerovich et al. |
| 6,380,802 B1 | 4/2002 | Pehike et al. |
| 6,384,680 B1 | 5/2002 | Takei et al. |
| 6,384,681 B1 | 5/2002 | Bonds |
| 6,385,439 B1 | 5/2002 | Hellberg |
| 6,388,513 B1 | 5/2002 | Wright et al. |
| 6,392,483 B2 | 5/2002 | Suzuki et al. |
| 6,396,341 B1 | 5/2002 | Pehlke |
| 6,396,347 B1 | 5/2002 | Lie et al. |
| 6,404,823 B1 | 6/2002 | Grange et al. |
| 6,407,635 B2 | 6/2002 | Mucenieks et al. |
| 6,411,655 B1 | 6/2002 | Holden et al. |
| 6,421,389 B1 | 7/2002 | Jett et al. |
| 6,424,216 B2 | 7/2002 | Mu et al. |
| 6,434,122 B2 | 8/2002 | Barabash et al. |
| 6,437,644 B1 | 8/2002 | Kenington |
| 6,449,465 B1 | 9/2002 | Gailus et al. |
| 6,452,446 B1 | 9/2002 | Eisenberg et al. |
| 6,459,334 B2 | 10/2002 | Wright et al. |
| 6,459,337 B1 | 10/2002 | Goren et al. |
| 6,462,617 B1 | 10/2002 | Kim |
| 6,469,581 B1 | 10/2002 | Kobayashi |
| 6,470,431 B2 | 10/2002 | Nicosia et al. |
| 6,472,934 B1 | 10/2002 | Pehlke |
| 6,472,937 B1 | 10/2002 | Gerard et al. |
| 6,476,670 B1 | 11/2002 | Wright et al. |
| 6,496,062 B1 | 12/2002 | Nitz et al. |
| 6,501,331 B2 | 12/2002 | Adar |
| 6,504,428 B2 | 1/2003 | Cova et al. |
| 6,504,447 B1 | 1/2003 | Laney et al. |
| 6,507,731 B1 | 1/2003 | Hasegawa |
| 6,510,309 B1 | 1/2003 | Thompson et al. |
| 6,510,310 B1 | 1/2003 | Muralidharan |
| 6,512,416 B2 | 1/2003 | Burns et al. |
| 6,522,194 B1 | 2/2003 | Pehlke |
| 6,522,198 B2 | 2/2003 | Ahn |
| 6,522,201 B1 | 2/2003 | Hsiao et al. |
| 6,525,605 B2 | 2/2003 | Hu et al. |
| 6,529,773 B1 | 3/2003 | Dewan |
| 6,531,935 B1 | 3/2003 | Russat et al. |
| 6,535,060 B2 | 3/2003 | Goren et al. |
| 6,538,509 B2 | 3/2003 | Ren |
| 6,538,793 B2 | 3/2003 | Rosenberg et al. |
| 6,545,535 B2 | 4/2003 | Andre |
| 6,552,634 B1 | 4/2003 | Raab |
| 6,566,944 B1 | 5/2003 | Pehlke et al. |
| 6,577,199 B2 | 6/2003 | Dent |
| 6,577,691 B2 | 6/2003 | Richards et al. |
| 6,583,679 B1 | 6/2003 | Cox et al. |
| 6,583,739 B1 | 6/2003 | Kenington |
| 6,586,995 B1 | 7/2003 | Tachibana |
| 6,587,010 B2 | 7/2003 | Wagh et al. |
| 6,587,511 B2 | 7/2003 | Barak et al. |
| 6,587,514 B1 | 7/2003 | Wright et al. |
| 6,587,913 B2 | 7/2003 | Campanale et al. |
| 6,593,806 B1 | 7/2003 | Melanson |
| 6,600,368 B2 | 7/2003 | Kim |
| 6,603,352 B2 | 8/2003 | Wight |
| 6,606,483 B1 | 8/2003 | Baker et al. |
| 6,614,854 B1 | 9/2003 | Chow et al. |
| 6,622,198 B2 | 9/2003 | Jones, Jr. |
| 6,624,694 B2 | 9/2003 | Ma et al. |
| 6,633,200 B2 | 10/2003 | Kolanek |
| 6,636,112 B1 | 10/2003 | McCune |

(56) References Cited

U.S. PATENT DOCUMENTS

| | | |
|---|---|---|
| 6,637,030 B1 | 10/2003 | Klein |
| 6,646,505 B2 | 11/2003 | Anderson |
| 6,647,073 B2 | 11/2003 | Tapio |
| 6,653,896 B2 | 11/2003 | Sevic et al. |
| 6,672,167 B2 | 1/2004 | Buell et al. |
| 6,674,326 B1 | 1/2004 | Hiramoto et al. |
| 6,678,041 B2 | 1/2004 | Kimura et al. |
| 6,681,101 B1 | 1/2004 | Eidson et al. |
| 6,683,918 B2 | 1/2004 | Jackson et al. |
| 6,690,232 B2 | 2/2004 | Ueno et al. |
| 6,690,233 B2 | 2/2004 | Sander |
| 6,697,436 B1 | 2/2004 | Wright et al. |
| 6,697,603 B1 | 2/2004 | Lovinggood et al. |
| 6,700,440 B2 | 3/2004 | Hareyama |
| 6,700,441 B1 | 3/2004 | Zhang et al. |
| 6,700,453 B2 | 3/2004 | Heiskala et al. |
| 6,701,419 B2 | 3/2004 | Tomaiuolo et al. |
| 6,707,338 B2 | 3/2004 | Kenington et al. |
| 6,714,776 B1 | 3/2004 | Birleson |
| 6,724,252 B2 | 4/2004 | Ngo et al. |
| 6,735,424 B1 | 5/2004 | Larson et al. |
| 6,737,914 B2 | 5/2004 | Gu |
| 6,737,916 B2 | 5/2004 | Luu |
| 6,741,840 B2 | 5/2004 | Nagode et al. |
| 6,741,867 B1 | 5/2004 | Tetsuya |
| 6,750,707 B2 | 6/2004 | Takei et al. |
| 6,751,265 B1 | 6/2004 | Schell et al. |
| 6,757,526 B1 | 6/2004 | Sharp et al. |
| 6,763,062 B1 | 7/2004 | Kohno et al. |
| 6,765,519 B2 | 7/2004 | Karlquist |
| 6,781,534 B2 | 8/2004 | Karlquist |
| 6,784,732 B2 | 8/2004 | Hajimiri et al. |
| 6,784,837 B2 | 8/2004 | Revankar et al. |
| 6,785,342 B1 | 8/2004 | Isaksen et al. |
| 6,791,408 B2 | 9/2004 | Goren et al. |
| 6,791,410 B2 | 9/2004 | Kim et al. |
| 6,794,934 B2 | 9/2004 | Betti-Berutto et al. |
| 6,794,938 B2 | 9/2004 | Weldon |
| 6,798,377 B1 | 9/2004 | Lupash et al. |
| 6,798,843 B1 | 9/2004 | Wright et al. |
| 6,801,086 B1 | 10/2004 | Chandrasekaran |
| 6,801,567 B1 | 10/2004 | Schmidl et al. |
| 6,806,767 B2 | 10/2004 | Dow |
| 6,806,789 B2 | 10/2004 | Bawell et al. |
| 6,819,171 B2 | 11/2004 | Kenington |
| 6,819,176 B1 | 11/2004 | Lee |
| 6,819,720 B1 | 11/2004 | Willetts |
| 6,825,719 B1 | 11/2004 | Barak et al. |
| 6,829,471 B2 | 12/2004 | White et al. |
| 6,831,491 B2 | 12/2004 | Karlquist |
| 6,834,183 B2 | 12/2004 | Black et al. |
| 6,836,183 B2 | 12/2004 | Wight |
| 6,838,942 B1 | 1/2005 | Somerville et al. |
| 6,842,070 B2 | 1/2005 | Nilsson |
| 6,847,266 B2 | 1/2005 | Laney et al. |
| 6,853,244 B2 | 2/2005 | Robinson et al. |
| 6,853,247 B2 | 2/2005 | Weldon |
| 6,853,248 B2 | 2/2005 | Weldon |
| 6,859,098 B2 | 2/2005 | Husseini |
| 6,864,742 B2 | 3/2005 | Kobayashi |
| 6,867,647 B2 | 3/2005 | Wouters |
| 6,873,211 B1 | 3/2005 | Thompson et al. |
| 6,879,209 B2 | 4/2005 | Grundlingh |
| 6,882,217 B1 | 4/2005 | Mueller |
| 6,882,711 B1 | 4/2005 | Nicol |
| 6,882,829 B2 | 4/2005 | Mostov et al. |
| 6,889,034 B1 | 5/2005 | Dent |
| 6,891,432 B2 | 5/2005 | Nagle et al. |
| 6,900,694 B2 | 5/2005 | Suzuki et al. |
| 6,906,585 B2 | 6/2005 | Weldon |
| 6,914,487 B1 | 7/2005 | Doyle et al. |
| 6,917,244 B2 | 7/2005 | Rosnell et al. |
| 6,917,389 B2 | 7/2005 | Lee |
| 6,924,699 B2 | 8/2005 | Ahmed |
| 6,928,272 B2 | 8/2005 | Doi |
| 6,930,547 B2 | 8/2005 | Chandrasekaran et al. |
| 6,937,096 B2 | 8/2005 | Wight et al. |
| 6,937,102 B2 | 8/2005 | Lopez et al. |
| 6,940,349 B2 | 9/2005 | Hellberg |
| 6,943,624 B2 | 9/2005 | Ohnishi et al. |
| 6,947,713 B2 | 9/2005 | Checoury et al. |
| 6,960,956 B2 | 11/2005 | Pehlke et al. |
| 6,970,040 B1 | 11/2005 | Dening |
| 6,975,177 B2 | 12/2005 | Varis et al. |
| 6,980,780 B2 | 12/2005 | Chen et al. |
| 6,987,954 B2 | 1/2006 | Nielsen |
| 6,990,323 B2 | 1/2006 | Prikhodko et al. |
| 6,993,301 B1 | 1/2006 | Kenington et al. |
| 7,010,276 B2 | 3/2006 | Sander et al. |
| 7,015,752 B2 | 3/2006 | Saed |
| 7,023,272 B2 | 4/2006 | Hung et al. |
| 7,026,871 B2 | 4/2006 | Saèd |
| 7,030,714 B2 | 4/2006 | Korol |
| 7,031,382 B2 | 4/2006 | Hessel et al. |
| 7,034,613 B2 | 4/2006 | Saèd |
| 7,035,607 B2 | 4/2006 | Lim et al. |
| 7,042,283 B2 | 5/2006 | Suzuki et al. |
| 7,042,286 B2 | 5/2006 | Meade et al. |
| 7,043,208 B2 | 5/2006 | Nigra |
| 7,043,213 B2 | 5/2006 | Robinson et al. |
| 7,054,296 B1 | 5/2006 | Sorrells et al. |
| 7,054,597 B2 | 5/2006 | Rosnell |
| 7,057,461 B1 | 6/2006 | Canilao et al. |
| 7,064,607 B2 | 6/2006 | Maclean et al. |
| 7,068,099 B2 | 6/2006 | Versteegen |
| 7,068,101 B2 | 6/2006 | Saèd et al. |
| 7,068,103 B2 | 6/2006 | Lind |
| 7,071,774 B2 | 7/2006 | Hellberg |
| 7,071,777 B2 | 7/2006 | McBeath et al. |
| 7,078,976 B2 | 7/2006 | Blednov |
| 7,081,795 B2 | 7/2006 | Matsuura et al. |
| 7,084,702 B1 | 8/2006 | Ichitsubo et al. |
| 7,088,970 B2 | 8/2006 | Williams |
| 7,091,775 B2 | 8/2006 | Ichitsubo et al. |
| 7,091,777 B2 | 8/2006 | Lynch |
| 7,092,675 B2 | 8/2006 | Lim et al. |
| 7,092,676 B2 | 8/2006 | Abdelgany et al. |
| 7,099,382 B2 | 8/2006 | Aronson et al. |
| 7,103,328 B2 | 9/2006 | Zelley |
| 7,132,900 B2 | 11/2006 | Yahagi et al. |
| 7,139,535 B2 | 11/2006 | Zschunke |
| 7,145,397 B2 | 12/2006 | Yamamoto et al. |
| 7,173,980 B2 | 2/2007 | Masenten et al. |
| 7,177,418 B2 | 2/2007 | Maclean et al. |
| 7,184,723 B2 | 2/2007 | Sorrells et al. |
| 7,193,459 B1 | 3/2007 | Epperson et al. |
| 7,197,284 B2 | 3/2007 | Brandt et al. |
| 7,200,369 B2 | 4/2007 | Kim et al. |
| 7,230,996 B2 | 6/2007 | Matsuura et al. |
| 7,242,245 B2 | 7/2007 | Burns et al. |
| 7,248,841 B2 | 7/2007 | Agee et al. |
| 7,260,368 B1 | 8/2007 | Blumer |
| 7,260,369 B2 | 8/2007 | Feher |
| 7,292,189 B2 | 11/2007 | Orr et al. |
| 7,327,803 B2 | 2/2008 | Sorrells et al. |
| 7,345,534 B2 | 3/2008 | Grebennikov |
| 7,345,629 B2 | 3/2008 | Dulmovits, Jr. et al. |
| 7,349,673 B2 | 3/2008 | Moloudi et al. |
| 7,355,470 B2 | 4/2008 | Sorrells et al. |
| 7,378,902 B2 | 5/2008 | Sorrells et al. |
| 7,382,182 B2 | 6/2008 | Trocke et al. |
| 7,403,579 B2 | 7/2008 | Jaffe et al. |
| 7,414,469 B2 | 8/2008 | Sorrells et al. |
| 7,421,036 B2 | 9/2008 | Sorrells et al. |
| 7,423,477 B2 | 9/2008 | Sorrells et al. |
| 7,428,230 B2 | 9/2008 | Park |
| 7,436,894 B2 | 10/2008 | Norris |
| 7,440,733 B2 | 10/2008 | Maslennikov et al. |
| 7,459,893 B2 | 12/2008 | Jacobs |
| 7,460,612 B2 | 12/2008 | Eliezer et al. |
| 7,466,760 B2 | 12/2008 | Sorrells et al. |
| 7,474,695 B2 | 1/2009 | Liu et al. |
| 7,486,894 B2 | 2/2009 | Aronson et al. |
| 7,502,599 B2 | 3/2009 | Ben-Ayun et al. |

(56) References Cited

U.S. PATENT DOCUMENTS

| | | |
|---|---|---|
| 7,509,102 B2 | 3/2009 | Rofougaran et al. |
| 7,526,261 B2 | 4/2009 | Sorrells et al. |
| 7,560,984 B2 | 7/2009 | Akizuki et al. |
| 7,616,057 B2 | 11/2009 | Sutardja |
| 7,620,129 B2 | 11/2009 | Sorrells et al. |
| 7,639,072 B2 | 12/2009 | Sorrells et al. |
| 7,647,030 B2 | 1/2010 | Sorrells et al. |
| 7,672,648 B1 | 3/2010 | Groe et al. |
| 7,672,650 B2 | 3/2010 | Sorrells et al. |
| 7,738,853 B2 | 6/2010 | Eddy et al. |
| 7,750,733 B2 | 7/2010 | Sorrells et al. |
| RE41,582 E | 8/2010 | Larson et al. |
| 7,778,320 B2 | 8/2010 | Agazzi et al. |
| 7,835,709 B2 | 11/2010 | Sorrells et al. |
| 7,844,235 B2 | 11/2010 | Sorrells et al. |
| 7,885,682 B2 | 2/2011 | Sorrells et al. |
| 7,907,671 B2 | 3/2011 | Klomsdorf et al. |
| 7,911,272 B2 | 3/2011 | Sorrells et al. |
| 7,929,989 B2 | 4/2011 | Sorrells et al. |
| 7,932,776 B2 | 4/2011 | Sorrells et al. |
| 7,937,106 B2 | 5/2011 | Sorrells et al. |
| 7,945,224 B2 | 5/2011 | Sorrells et al. |
| 7,949,365 B2 | 5/2011 | Sorrells et al. |
| 7,978,390 B2 | 7/2011 | Kikuchi |
| 8,013,675 B2 | 9/2011 | Sorrells et al. |
| 8,026,764 B2 | 9/2011 | Sorrells et al. |
| 8,031,804 B2 | 10/2011 | Sorrells et al. |
| 8,036,306 B2 | 10/2011 | Sorrells et al. |
| 8,050,353 B2 | 11/2011 | Sorrells et al. |
| 8,059,749 B2 | 11/2011 | Sorrells et al. |
| 8,073,078 B2 | 12/2011 | Kaczman et al. |
| 8,170,081 B2 | 5/2012 | Forenza et al. |
| 8,233,858 B2 | 7/2012 | Sorrells et al. |
| 8,271,223 B2 * | 9/2012 | Rawlins et al. ................ 702/90 |
| 8,280,321 B2 | 10/2012 | Sorrells et al. |
| 8,315,336 B2 | 11/2012 | Sorrells et al. |
| 8,334,722 B2 | 12/2012 | Sorrells et al. |
| 8,351,870 B2 | 1/2013 | Sorrells et al. |
| 8,355,466 B2 | 1/2013 | Kleider et al. |
| 8,369,807 B2 | 2/2013 | Mikhemar et al. |
| 8,384,484 B2 | 2/2013 | Winslow |
| 8,406,711 B2 | 3/2013 | Sorrells et al. |
| 8,410,849 B2 | 4/2013 | Sorrells et al. |
| 8,428,527 B2 | 4/2013 | Sorrells et al. |
| 8,433,264 B2 | 4/2013 | Sorrells et al. |
| 8,433,745 B2 | 4/2013 | Roger |
| 8,447,248 B2 | 5/2013 | Sorrells et al. |
| 8,461,924 B2 | 6/2013 | Rawlins et al. |
| 8,502,600 B2 | 8/2013 | Rawlins et al. |
| 8,548,093 B2 | 10/2013 | Sorrells et al. |
| 8,577,313 B2 | 11/2013 | Sorrells et al. |
| 8,626,093 B2 | 1/2014 | Sorrells et al. |
| 8,639,196 B2 | 1/2014 | Sorrells et al. |
| 8,755,454 B2 | 6/2014 | Sorrells et al. |
| 8,766,717 B2 | 7/2014 | Sorrells et al. |
| 8,781,418 B2 | 7/2014 | Sorrells et al. |
| 8,884,694 B2 | 11/2014 | Sorrells et al. |
| 8,913,691 B2 | 12/2014 | Sorrells et al. |
| 8,913,974 B2 | 12/2014 | Sorrells et al. |
| 2001/0001008 A1 | 5/2001 | Dent |
| 2001/0004373 A1 | 6/2001 | Hirata |
| 2001/0006354 A1 | 7/2001 | Lee |
| 2001/0006359 A1 | 7/2001 | Suzuki et al. |
| 2001/0011961 A1 | 8/2001 | Rexberg et al. |
| 2001/0030581 A1 | 10/2001 | Dent |
| 2001/0052816 A1 | 12/2001 | Ahn |
| 2002/0008577 A1 | 1/2002 | Cova et al. |
| 2002/0027958 A1 | 3/2002 | Kolanek |
| 2002/0042253 A1 | 4/2002 | Dartois |
| 2002/0047745 A1 | 4/2002 | Kolanek |
| 2002/0053973 A1 | 5/2002 | Ward, Jr. |
| 2002/0058486 A1 | 5/2002 | Persson |
| 2002/0071497 A1 | 6/2002 | Bengtsson et al. |
| 2002/0079962 A1 | 6/2002 | Sander |
| 2002/0084845 A1 | 7/2002 | Eisenberg et al. |
| 2002/0086707 A1 | 7/2002 | Struhsaker et al. |
| 2002/0094034 A1 | 7/2002 | Moriyama |
| 2002/0101907 A1 | 8/2002 | Dent et al. |
| 2002/0105378 A1 | 8/2002 | Tapio |
| 2002/0105384 A1 | 8/2002 | Dent |
| 2002/0125947 A1 | 9/2002 | Ren |
| 2002/0126769 A1 | 9/2002 | Jett et al. |
| 2002/0127986 A1 | 9/2002 | White et al. |
| 2002/0130716 A1 | 9/2002 | Larson et al. |
| 2002/0130727 A1 | 9/2002 | Nagasaka |
| 2002/0130729 A1 | 9/2002 | Larson et al. |
| 2002/0136275 A1 | 9/2002 | Wight |
| 2002/0136325 A1 | 9/2002 | Pehlke et al. |
| 2002/0146996 A1 | 10/2002 | Bachman, II et al. |
| 2002/0153950 A1 | 10/2002 | Kusunoki et al. |
| 2002/0159532 A1 | 10/2002 | Wight |
| 2002/0164965 A1 | 11/2002 | Chominski et al. |
| 2002/0168025 A1 | 11/2002 | Schwent et al. |
| 2002/0171478 A1 | 11/2002 | Wouters |
| 2002/0171485 A1 | 11/2002 | Cova |
| 2002/0172376 A1 | 11/2002 | Bizjak |
| 2002/0180547 A1 | 12/2002 | Staszewski et al. |
| 2002/0183021 A1 | 12/2002 | Brandt |
| 2002/0186079 A1 | 12/2002 | Kobayashi |
| 2002/0191638 A1 | 12/2002 | Wang et al. |
| 2002/0196864 A1 | 12/2002 | Booth et al. |
| 2003/0006845 A1 | 1/2003 | Lopez et al. |
| 2003/0031268 A1 | 2/2003 | Wight |
| 2003/0041667 A1 | 3/2003 | White |
| 2003/0083026 A1 | 5/2003 | Liu |
| 2003/0087625 A1 | 5/2003 | Conti |
| 2003/0098753 A1 | 5/2003 | Wagh et al. |
| 2003/0102910 A1 | 6/2003 | Sevic et al. |
| 2003/0102914 A1 | 6/2003 | Kenington et al. |
| 2003/0107435 A1 | 6/2003 | Gu |
| 2003/0114124 A1 | 6/2003 | Higuchi |
| 2003/0118121 A1 | 6/2003 | Makinen |
| 2003/0119526 A1 | 6/2003 | Edge |
| 2003/0123566 A1 | 7/2003 | Hasson |
| 2003/0125065 A1 | 7/2003 | Barak et al. |
| 2003/0132800 A1 | 7/2003 | Kenington |
| 2003/0143967 A1 | 7/2003 | Ciccarelli et al. |
| 2003/0179041 A1 | 9/2003 | Weldon |
| 2003/0190895 A1 | 10/2003 | Mostov et al. |
| 2003/0201835 A1 | 10/2003 | Dening et al. |
| 2003/0210096 A1 | 11/2003 | Pengelly et al. |
| 2003/0210746 A1 | 11/2003 | Asbeck et al. |
| 2003/0219067 A1 | 11/2003 | Birkett et al. |
| 2003/0220086 A1 | 11/2003 | Birkett |
| 2003/0228856 A1 | 12/2003 | Orihashi et al. |
| 2003/0231057 A1 | 12/2003 | Hiramoto et al. |
| 2004/0008081 A1 | 1/2004 | Friedel et al. |
| 2004/0021517 A1 | 2/2004 | Irvine et al. |
| 2004/0025104 A1 | 2/2004 | Amer |
| 2004/0027198 A1 | 2/2004 | Chandrasekaran et al. |
| 2004/0037363 A1 | 2/2004 | Norsworthy et al. |
| 2004/0037378 A1 | 2/2004 | Komori et al. |
| 2004/0046524 A1 | 3/2004 | Zschunke |
| 2004/0052312 A1 | 3/2004 | Matero |
| 2004/0056723 A1 | 3/2004 | Gotou |
| 2004/0062397 A1 | 4/2004 | Amer |
| 2004/0075492 A1 | 4/2004 | Wight |
| 2004/0076238 A1 | 4/2004 | Parker et al. |
| 2004/0085134 A1 | 5/2004 | Griffith et al. |
| 2004/0092281 A1 | 5/2004 | Burchfiel |
| 2004/0095192 A1 | 5/2004 | Krvavac |
| 2004/0101065 A1 | 5/2004 | Hagh et al. |
| 2004/0108896 A1 | 6/2004 | Midtgaard |
| 2004/0113698 A1 | 6/2004 | Kim et al. |
| 2004/0119477 A1 | 6/2004 | Kazemi-Nia |
| 2004/0119514 A1 | 6/2004 | Karlquist |
| 2004/0119622 A1 | 6/2004 | Karlquist |
| 2004/0119624 A1 | 6/2004 | Karlquist |
| 2004/0125006 A1 | 7/2004 | Tani et al. |
| 2004/0131131 A1 | 7/2004 | Peach et al. |
| 2004/0135630 A1 | 7/2004 | Hellberg |
| 2004/0142667 A1 | 7/2004 | Lochhead et al. |
| 2004/0146116 A1 | 7/2004 | Kang et al. |
| 2004/0166813 A1 | 8/2004 | Mann et al. |

(56) References Cited

U.S. PATENT DOCUMENTS

| | | |
|---|---|---|
| 2004/0169559 A1 | 9/2004 | Weldon |
| 2004/0172583 A1 | 9/2004 | Amer |
| 2004/0174213 A1 | 9/2004 | Thompson |
| 2004/0181745 A1 | 9/2004 | Amer |
| 2004/0184559 A1 | 9/2004 | Ballantyne |
| 2004/0185805 A1 | 9/2004 | Kim et al. |
| 2004/0189380 A1 | 9/2004 | Myer et al. |
| 2004/0189381 A1 | 9/2004 | Louis |
| 2004/0196899 A1 | 10/2004 | Zhou et al. |
| 2004/0198263 A1 | 10/2004 | Ode et al. |
| 2004/0222851 A1 | 11/2004 | Weldon |
| 2004/0224715 A1 | 11/2004 | Rosenlof et al. |
| 2004/0227570 A1 | 11/2004 | Jackson et al. |
| 2004/0233599 A1 | 11/2004 | Busking |
| 2004/0246060 A1 | 12/2004 | Varis et al. |
| 2004/0251962 A1 | 12/2004 | Rosnell et al. |
| 2004/0263242 A1 | 12/2004 | Hellberg |
| 2004/0263245 A1 | 12/2004 | Winter et al. |
| 2004/0263246 A1 | 12/2004 | Robinson et al. |
| 2004/0266059 A1 | 12/2004 | Wight et al. |
| 2004/0266365 A1 | 12/2004 | Hasson et al. |
| 2004/0266368 A1 | 12/2004 | Rosnell |
| 2004/0266374 A1 | 12/2004 | Saed et al. |
| 2004/0267399 A1 | 12/2004 | Funk |
| 2005/0001674 A1 | 1/2005 | Saed et al. |
| 2005/0001675 A1 | 1/2005 | Saed |
| 2005/0001676 A1 | 1/2005 | Saed |
| 2005/0001677 A1 | 1/2005 | Saed |
| 2005/0001678 A1 | 1/2005 | Saed |
| 2005/0001679 A1 | 1/2005 | Saed |
| 2005/0002470 A1 | 1/2005 | Saed et al. |
| 2005/0003770 A1 | 1/2005 | Saed |
| 2005/0007194 A1 | 1/2005 | Grundlingh |
| 2005/0012547 A1 | 1/2005 | Kwon et al. |
| 2005/0018787 A1 | 1/2005 | Saed |
| 2005/0024262 A1 | 2/2005 | Cantrell et al. |
| 2005/0025181 A1 | 2/2005 | Nazari |
| 2005/0047038 A1 | 3/2005 | Nakajima et al. |
| 2005/0058059 A1 | 3/2005 | Amer |
| 2005/0058193 A1 | 3/2005 | Saed |
| 2005/0058209 A1 | 3/2005 | Magrath |
| 2005/0058227 A1 | 3/2005 | Birkett et al. |
| 2005/0058228 A1 | 3/2005 | Birkett |
| 2005/0073360 A1 | 4/2005 | Johnson et al. |
| 2005/0073374 A1 | 4/2005 | Korol |
| 2005/0088226 A1 | 4/2005 | Robinson et al. |
| 2005/0110590 A1 | 5/2005 | Korol |
| 2005/0111574 A1 | 5/2005 | Muller et al. |
| 2005/0118973 A1 | 6/2005 | Khlat |
| 2005/0129140 A1 | 6/2005 | Robinson |
| 2005/0129141 A1 | 6/2005 | Lee |
| 2005/0136864 A1 | 6/2005 | Zipper |
| 2005/0141640 A1 | 6/2005 | Maruyama |
| 2005/0181746 A1 | 8/2005 | Wight |
| 2005/0191976 A1 | 9/2005 | Shakeshaft et al. |
| 2005/0195031 A1 | 9/2005 | Grundlingh |
| 2005/0195763 A1* | 9/2005 | Kadous et al. ............... 370/328 |
| 2005/0201483 A1 | 9/2005 | Coersmeier |
| 2005/0215206 A1 | 9/2005 | Granstrom et al. |
| 2005/0227646 A1 | 10/2005 | Yamazaki et al. |
| 2005/0242879 A1 | 11/2005 | Muller |
| 2005/0253652 A1 | 11/2005 | Song et al. |
| 2005/0253745 A1 | 11/2005 | Song et al. |
| 2005/0260956 A1 | 11/2005 | Loraine et al. |
| 2006/0006946 A1 | 1/2006 | Burns et al. |
| 2006/0017500 A1 | 1/2006 | Hellberg |
| 2006/0035618 A1 | 2/2006 | Pleasant |
| 2006/0052068 A1 | 3/2006 | Sander et al. |
| 2006/0052124 A1 | 3/2006 | Pottenger et al. |
| 2006/0055458 A1 | 3/2006 | Shiikuma et al. |
| 2006/0066396 A1 | 3/2006 | Brandt |
| 2006/0068707 A1 | 3/2006 | Greeley |
| 2006/0088081 A1 | 4/2006 | Withington et al. |
| 2006/0142821 A1 | 6/2006 | Bange et al. |
| 2006/0160502 A1 | 7/2006 | Kintis |
| 2006/0220625 A1 | 10/2006 | Chapuis |
| 2006/0238245 A1 | 10/2006 | Carichner et al. |
| 2006/0262889 A1 | 11/2006 | Kalvaitis et al. |
| 2006/0264190 A1 | 11/2006 | Aleiner |
| 2006/0291589 A1 | 12/2006 | Eliezer et al. |
| 2006/0292999 A1 | 12/2006 | Sorrells et al. |
| 2006/0293000 A1 | 12/2006 | Sorrells et al. |
| 2007/0019757 A1 | 1/2007 | Matero |
| 2007/0021080 A1 | 1/2007 | Kuriyama et al. |
| 2007/0030063 A1 | 2/2007 | Izumi et al. |
| 2007/0050758 A1 | 3/2007 | Arevalo et al. |
| 2007/0071114 A1 | 3/2007 | Sanderford et al. |
| 2007/0076814 A1 | 4/2007 | Ikeda et al. |
| 2007/0082630 A1 | 4/2007 | Aridas et al. |
| 2007/0087708 A1 | 4/2007 | Sorrells et al. |
| 2007/0087709 A1 | 4/2007 | Sorrells et al. |
| 2007/0090874 A1 | 4/2007 | Sorrells et al. |
| 2007/0096806 A1 | 5/2007 | Sorrells et al. |
| 2007/0111686 A1 | 5/2007 | Lee |
| 2007/0127563 A1 | 6/2007 | Wu et al. |
| 2007/0155344 A1 | 7/2007 | Wiessner et al. |
| 2007/0184790 A1 | 8/2007 | Gilberton et al. |
| 2007/0190952 A1 | 8/2007 | Waheed et al. |
| 2007/0194986 A1 | 8/2007 | Dulmovits, Jr. et al. |
| 2007/0218852 A1 | 9/2007 | Huynh |
| 2007/0247217 A1 | 10/2007 | Sorrells et al. |
| 2007/0247220 A1 | 10/2007 | Sorrells et al. |
| 2007/0247221 A1 | 10/2007 | Sorrells et al. |
| 2007/0248156 A1 | 10/2007 | Sorrells et al. |
| 2007/0248185 A1 | 10/2007 | Sorrells et al. |
| 2007/0248186 A1 | 10/2007 | Sorrells et al. |
| 2007/0249299 A1 | 10/2007 | Sorrells et al. |
| 2007/0249300 A1 | 10/2007 | Sorrells et al. |
| 2007/0249301 A1 | 10/2007 | Sorrells et al. |
| 2007/0249302 A1 | 10/2007 | Sorrells et al. |
| 2007/0249304 A1 | 10/2007 | Snelgrove et al. |
| 2007/0291668 A1 | 12/2007 | Duan |
| 2008/0003960 A1 | 1/2008 | Zolfaghari |
| 2008/0019459 A1 | 1/2008 | Chen et al. |
| 2008/0072025 A1 | 3/2008 | Staszewski et al. |
| 2008/0089252 A1 | 4/2008 | Choi |
| 2008/0133982 A1 | 6/2008 | Rawlins et al. |
| 2008/0225929 A1 | 9/2008 | Proctor et al. |
| 2008/0225935 A1 | 9/2008 | Reddy |
| 2008/0259846 A1 | 10/2008 | Gonikberg et al. |
| 2008/0272841 A1 | 11/2008 | Sorrells et al. |
| 2008/0299913 A1 | 12/2008 | Han et al. |
| 2008/0311860 A1 | 12/2008 | Tanaka et al. |
| 2009/0004981 A1 | 1/2009 | Eliezer et al. |
| 2009/0063070 A1 | 3/2009 | Renneberg |
| 2009/0070568 A1 | 3/2009 | Shi et al. |
| 2009/0072898 A1* | 3/2009 | Sorrells et al. ............... 330/127 |
| 2009/0091384 A1 | 4/2009 | Sorrells et al. |
| 2009/0134947 A1 | 5/2009 | Tarng |
| 2009/0201084 A1 | 8/2009 | See et al. |
| 2009/0227214 A1 | 9/2009 | Georgantas et al. |
| 2009/0238249 A1 | 9/2009 | van Waasen et al. |
| 2009/0262861 A1 | 10/2009 | Nielsen |
| 2009/0262877 A1 | 10/2009 | Shi et al. |
| 2010/0013527 A1 | 1/2010 | Warnick |
| 2010/0103052 A1 | 4/2010 | Ying |
| 2010/0311353 A1 | 12/2010 | Teillet et al. |
| 2010/0329395 A1 | 12/2010 | Kang et al. |
| 2011/0099406 A1 | 4/2011 | Bell |
| 2011/0300885 A1 | 12/2011 | Darabi et al. |
| 2012/0025624 A1 | 2/2012 | Lee et al. |
| 2012/0153731 A9 | 6/2012 | Kirby et al. |
| 2012/0263215 A1 | 10/2012 | Peng |
| 2012/0321007 A1 | 12/2012 | Feher |
| 2013/0031442 A1* | 1/2013 | Rawlins et al. ............... 714/763 |
| 2013/0080495 A1* | 3/2013 | Staszewski et al. ............ 708/670 |
| 2013/0101076 A1 | 4/2013 | Hickling et al. |
| 2013/0122973 A1 | 5/2013 | Caskey |
| 2013/0329839 A1* | 12/2013 | Kobayashi et al. ............ 375/345 |

FOREIGN PATENT DOCUMENTS

| | | |
|---|---|---|
| EP | 0 630 104 A2 | 12/1994 |
| EP | 0 708 546 A2 | 4/1996 |

(56) References Cited

FOREIGN PATENT DOCUMENTS

| | | |
|---|---|---|
| EP | 0 471 346 B1 | 11/1996 |
| EP | 0 639 307 B1 | 12/1997 |
| EP | 0 821 304 A1 | 1/1998 |
| EP | 0 725 478 B1 | 8/1998 |
| EP | 0 892 529 A2 | 1/1999 |
| EP | 0 897 213 A1 | 2/1999 |
| EP | 0 598 585 B1 | 3/1999 |
| EP | 0 630 104 B1 | 8/2000 |
| EP | 0 821 304 B1 | 2/2002 |
| EP | 1 068 666 B1 | 5/2003 |
| EP | 1 381 154 A1 | 1/2004 |
| EP | 0 897 213 B1 | 3/2004 |
| EP | 1 487 100 A1 | 12/2004 |
| EP | 1 332 550 B1 | 3/2005 |
| EP | 1 142 250 B1 | 4/2005 |
| EP | 1 521 359 A1 | 4/2005 |
| EP | 1 583 228 A2 | 10/2005 |
| GB | 2159374 A | 11/1985 |
| GB | 2 267 402 | 12/1993 |
| JP | 54-022749 A | 2/1979 |
| JP | 60-63517 A | 4/1985 |
| JP | 1-284106 A | 11/1989 |
| JP | 2-87708 A | 3/1990 |
| JP | 3-232307 A | 10/1991 |
| JP | 3-276923 | 12/1991 |
| JP | 4-095409 A | 3/1992 |
| JP | 4-104604 A | 4/1992 |
| JP | 5-22046 A | 1/1993 |
| JP | 5-037263 A | 2/1993 |
| JP | 4-338728 A | 12/1994 |
| JP | H08-163189 A | 6/1996 |
| JP | 9-018536 A | 1/1997 |
| JP | 9-074320 A | 3/1997 |
| JP | 10-70451 A | 3/1998 |
| JP | 2000-209291 A | 7/2000 |
| JP | 2000-244261 A | 9/2000 |
| JP | 2001-136057 A | 5/2001 |
| JP | 2001-217659 A | 8/2001 |
| JP | 2001-308650 A | 11/2001 |
| JP | 2002-543729 A | 12/2002 |
| JP | 2003-298357 A | 10/2003 |
| JP | 2003-298361 A | 10/2003 |
| JP | 2004-260707 A | 9/2004 |
| JP | 2005-101940 A | 4/2005 |
| JP | 2005-151543 A | 6/2005 |
| RO | 102824 | 11/1991 |
| RO | 100466 | 8/1992 |
| SU | 1322183 A1 | 7/1987 |
| WO | WO 94/21035 | 9/1994 |
| WO | WO 96/10310 | 4/1996 |
| WO | WO 96/19063 | 9/1996 |
| WO | WO 97/41642 | 11/1997 |
| WO | WO 97/48219 | 12/1997 |
| WO | WO 99/23755 | 5/1999 |
| WO | WO 99/52206 | 10/1999 |
| WO | WO 00/41371 | 7/2000 |
| WO | WO 00/67370 A1 | 11/2000 |
| WO | WO 01/03292 | 1/2001 |
| WO | WO 01/45205 | 6/2001 |
| WO | WO 01/91282 | 11/2001 |
| WO | WO 02/39377 | 5/2002 |
| WO | WO 02/082633 | 10/2002 |
| WO | WO 02/084864 A2 | 10/2002 |
| WO | WO 03/047093 | 6/2003 |
| WO | WO 03/061115 | 7/2003 |
| WO | WO 2004/023047 | 3/2004 |
| WO | WO 2004/036736 | 4/2004 |
| WO | WO 2004/057755 | 7/2004 |
| WO | WO 2005/031966 | 4/2005 |
| WO | WO 2005/036732 | 4/2005 |
| WO | WO 2005/055413 | 6/2005 |

OTHER PUBLICATIONS

English Abstract for Japanese Patent Publication No. JP 3-276923 A, published Dec. 9, 1991, downloaded from http://worldwide.espacenet.com, 2 pages.

Notification of Transmittal of the International Search Report and Written Opinion, dated Dec. 31, 2014, for PCT Appl. No. PCT/US2014/056086, 18 pages.

"Ampliphase AM transmission system," *ABU Technical Review*, No. 33, p. 10-18 (Jul. 1974).

"Designing an SSB Outphaser," *Electronics World*, pp. 306-310 (Apr. 1996).

"New 50 KW Ampliphase AM Transmitter," *RCA in Broadcast News*, No. 111, pp. 36-39 (Jun. 1961).

\*\*\**The Ampliphase Page*\*\*\*: *Ampliphase—A quick description. . .* , Reproduction of text from http://rossrevenge.co.uk/tx/ampli.htm, 13 pages (visited Jan. 18, 2006).

Ajluni, C., "Chip Set Withstands WLAN's Future Blows," at http://www.wsdmag.com/Articles/Print.cfm?ArticleID=6792, 5 pages (Oct. 2003).

Ampen-Darko, S. and Al-Raweshidy, H.S., "Gain/phase imbalance cancellation technique in LINC transmitters," *Electronics Letters*, vol. 34, No. 22, pp. 2093-2094 (Oct. 29, 1988).

Ampen-Darko, S.O. and Al-Raweshidy, H.S., "A Novel Technique for Gain/Phase Cancellation in LINC Transmitters," *IEEE VTS—50th Vehicular Technology Conference*, Amsterdam, pp. 2034-2038 (Sep. 19-22, 1999).

Andreani, P., *Linear PA architectures* (Chapter 13), available at http://server.oersted.dtu.dk/personal/pa/31636/pdf/pal.in.pdf, 10 pages (Jun. 14, 2007).

Ariyavisitakul, S. and Lie, T.P., "Characterizing the Effects of Non-linear Amplifiers on the Linear Modulatoin for Digital Portable Radio Communications," *IEEE Transactions on Vehicular Technology*, vol. 39, No. 4, pp. 383-389 (Nov. 1990).

*ARMMS—The RF and Microwave Society—Last Meeting*, at http://www.armms.org/last.html. 4 pages (printed Apr. 14, 2005).

Asbeck, P.M, et al., "Power Amplifier Approaches for High Efficiency and Linearity," in Itoh. T. et al. (eds.), *RF Technologies for Low Power Wireless Communications*, ISBN No. 0-471-38267-1, pp. 189-227 (2001).

Asbeck, P.M. et al., "Synergistic Design of DSP and Power Amplifiers for Wireless Communications,"*IEEE Transactions on Microwave Theory and Techniques*, vol. 49, No. 11, pp. 2163-2169 (Nov. 2001).

Banelli, P., "Error Sensitivity in Adaptive Predistortion Systems,"*Global Telecommunications Conference—Globecom '99*, pp. 883-888 (1999).

Bateman, A., et al., "The Application of Digital Signal Processing to Transmitter Linearisation," *EUROCON 88: 8th European Conference on Electrotechnics*, pp. 64-67 (Jun. 13-17, 1988).

Bespalov, V.B. and Aslamazyan, A.S., "Broadband Strip-Line SHF Ampliphasemeter," *Measurement Techniques* (Translated from Russian), vol. 25, No. 8, pp. 712-715 (Aug. 1982).

Birafane, A. and Kouki, A., "An Analytical Approach to LINC Power Combining Efficiency Estimation and Optimization," *33rd European Microwave Conference—Munich*, pp. 1227-1229 (2003).

Birafane, A. and Kouki, A., "Distortion Free LINC Amplifier with Chireix-Outphasing Combiner Using Phase-Only Predistortion," *34th European Microwave Conference—Amsterdam*, pp. 1069-1072 (2004).

Birafance, A. and Kouki, A., "On the Linearity and Efficiency of Outphasing Microwave Amplifiers," *IEEE Transactions on Microwave Theory and Techniques*, vol. 52, No. 7, pp. 1702-1708 (Jul. 2004).

Birafane, A. and Kouki, A., "Sources of Linearity Degradation in LINC Transmitters for Hybrid and Outphasing Combiners," *Canadian Conference on Electrical and Computer Engineering—Niagara Falls*, pp. 547-550 (May 2004).

(56) References Cited

OTHER PUBLICATIONS

Birafane, A. and Kouki, A.B., "Phase-Only Predistortion for LINC Amplifiers With Chireix-Outphasing Combiners," *IEEE Transactions on Microwave Theory and Techniques*, vol. 53, No. 6, pp. 2240-2250 (Jun. 2005).

Breed, G., "Intermodulation Distortion Performance and Measurement Issues," *High Frequency Electronics*, p. 56(2) (May 2003).

Bruckmann, H., "Modulation Arrangements and Operating Costs of Broadcasting and Radio-Telephony Transmitters," *Telegraphen-Fernsprech-Funk-und Fernsehtechnik*, vol. 24, pp. 83-91 (Apr. 1935).

Burnill, J., "Transmitting AM," *Electronics World + Wireless World*, pp. 58-60 (Jan. 1995).

Casadevall, F. and Olmos, J.J., "On the Behavior of the LINC Transmitter," *40th IEEE Vehicular Technology Conference*, pp. 29-34 (May 6-9, 1990).

Casadevall, F.J. and Valdovinos, A., "Performance Analysis of QAM Modulations Applied to the LINC Transmitter," *IEEE Transactions on Vehicular Technology*, vol. 42, No. 4, pp. 399-406 (Nov. 1993).

Casadevall, F.J., "The LINC Transmitter", *RF Design*, pp. 41-48 (Feb. 1990).

Cha, J. et al., "Highly Efficient Power Amplifier for CDMA Base Stations Using Doherty Configuration," *IEEE MTS-S International Microwave Symposium Digest*, pp. 533-536 (2004).

Chan, K.Y. et al., "Analysis and Realisation of the LINC Transmitter using the Combined Analogue Locked Loop Universal Modulator (CALLUM)," *IEEE 44th Vehicular Technology Conference*, vol. 1, pp. 484-488 (Jun. 8-10, 1994).

Chen, J-T. et al., "The Optimal RLS Parameter Tracking Algorithm for a Power Amplifier Feedforward Linearizer," *IEEE Transactions on Circuits and Systems-II: Analog and Digital Signal Processing*, vol. 46, No. 4, pp. 464-468 (Apr. 1999).

Chireix, H., "High Power Outphasing Modulation" *Proceedings of the Institute of Radio Engineers*, vol. 23, No. 11, pp. 1370-1392 (Nov. 1935).

Choi, L.U., *Multi-user MISO and MIMO Transmit Signal Processing for Wireless Communication*, PhD Thesis submitted to the Hong Kong University of Science and Technology, 191 pages, Mar. 2003.

Clark, G., "A Comparison of AM Techniques,"*ABU Technical Review*, No. 44, p. 33-42, (May 1976).

Clark, G., "A Comparison of Current Broadcast Amplitude Modulation Techniques", *IEEE Transactions on Broadcasting*, vol. BC-21, No. 2, pp. 25-31 (Jun. 1975).

Clifton, J.C. et al., "Novel Multimode J-pHEMT Front-End Architecture With Power-Control Scheme for Maximum Efficiency," *IEEE Transactions on Microwave Theory and Techniques*, vol. 53, No. 6, pp. 2251-2258 (Jun. 2005).

Colantonio, P., "High Linearity and Efficiency Microwave PAs," *12th GAAS Symposium—Amsterdam*, pp. 183-186 (2004).

*Computational Science Research Center Colloquium—Time Reversal Bases Communications in Complex Environments*, Friday, Apr. 9, 2004, 2 pages, printed Jul. 14, 2006 from http://www.sdsunivers.info/info_content_event.asp?id=15044.

Conradi, C.P. et al., "Evaluation of a Lossless Combiner in a LINC Transmitter," *Proceedings of the 1999 IEEE Canadian Conference on Electrical Computer Engineering*, pp. 105-110 (May 9-12, 1999).

Couch, L. and Walker, J.L., "A VHF LINC Amplifier,"*Proceedings of IEEE Southeastcon*, pp. 122-125 (1982).

*Course #08: Advanced RF Power Amplifier Techniques for Modern Wireless and Microwave Systems*, from http://www.cei.se/008.htm, 6 pages (printed Apr. 14, 2005).

*Course #114: Advanced RF Power Amplifier Techniques*, from http://www.bessercourse.com/outlinesOnly.asp?CTID=114, 3 pages (printed Jun. 22, 2005).

Cox, "Component Signal Separation and Recombination for Linear Amplification with Nonlinear Components," *IEEE Transactions on Communications*, vol. COM-23, No. 11, pp. 1281-1287 (Nov. 1975).

Cox, D.C. and Leck, R.P., "A VHF Implementation of a LINC Amplifier," *IEEE Transactions on Communications*, pp. 1018-1022 (Sep. 1976).

Cox, D.C., "Linear Amplification with Nonlinear Components," *IEEE Transactions on Communications*, vol. COM-22, pp. 1942-1945 (Dec. 1974).

Cripps, S.C., *Advanced Techniques in RF Power Amplifier Design*, Section 2—"Doherty and Chireix," pp. 33-72, Artech House (2002).

Cripps, Steve C., *PA Linearisation in RFICs . . . ignoring the obvious?*, available at http://www.cei.se/pa_milan.ppt, Hywave Associates, 24 pages (Created Aug. 2, 2001).

Cripps, Steve C., *RF Power Amplifier for Wireless Communications*, Artech House, ISBN No. 0890069891, pp. 240-250 (Apr. 1999).

Deltimple, N. et al., "A Reconfigurable RF Power Amplifier Biasing Scheme", *Proceedings of the 2nd Annual IEEE Northeast Workshop on Circuits and Systems (NEWCAS2004)*, pp. 365-368, (Jun. 20-23, 2004).

Dennis, A., "A Novel Digital Transmitter Architecture for Multimode/Multiband Applications: DTX, a Technology of MACOM," Tyco Electronics, 32 pages (Aug. 17, 2004).

Dinis, R. et al., "Performance Trade-Offs with Quasi-Linearly Amplified OFDM Through a Two-Branch Combining Technique," *IEEE 46th Vehicular Technology Conference*, pp. 899-903 (Apr. 28-May 1, 1996).

Ellinger, F. et al., "Calibratable Adaptive Antenna Combiner at 5.2 GHz with High Yield for Laptop Interface Card," *IEEE Transactions on Microwave Theory and Techniques*, vol. 48, No. 12, pp. 2714-2720 (Dec. 2000).

Faust, H.H et al., "A Spectrally Clean Transmitting System for Solid-State Phased-Array Radars," *Proceedings of the 2004 IEEE Radar Conference*, pp. 140-144 (Apr. 26-Apr. 29, 2004).

Fisher, S.T., "A New Method of Amplifying with High Efficiency a Carrier Wave Modulated in Amplitude by a Voice Wave," *Proceedings of the Institute of Radio Engineers*, vol. 34, pp. 3-13P (Jan. 1946).

Garcia, P. et al., "An Adaptive Digital Method of Imbalances Cancellation in LINC Transmitters," *IEEE Transactions on Vehicular Technology*, vol. 54, No. 3, pp. 879-888 (May 2005).

Gaudernack, L.F., "A Phase-Opposition System of Amplitude Modulation," *IRE Proceedings*, vol. 26, No. 8, pp. 983-1008 (Aug. 1938).

Gentzler, C.G. and Leong, S.K., "Broadband VHF/UHF Amplifier Design Using Coaxial Transformers," *High Frequency Electronics*, pp. 42, 44, 46, 48, 50, and 51 (May 2003).

Gerhard, W. and Knochel, R., "Digital Component Separator for future W-CDMA-LINC Transmitters implemented on an FPGA," *Advances in Radio Science*, 3, pp. 239-246 (2005).

Gründlingh, J. et al., "A High Efficiency Chireix Out-phasing Power Amplifier for 5GHz WLAN Applications," *IEEE MTT-S International Microwave Symposium Digest*, vol. 3, pp. 1535-1538 (2004).

Hakala, I. et al., "A 2.14-GHz Chireix Outphasing Transmitter," *IEEE Transactions on Microwave Theory and Techniques*, vol. 53, No. 6, pp. 2129-2138 (Jun. 2005).

Hakala, I. et al., "Chireix Power Combining with Saturated Class-B Power Amplifiers," *Conference Proceedings, 34th European Microwave Conference*, pp. 379-382 (2004).

Hamedi-Hagh, S. and Salama, A.T., "CMOS Wireless Phase-Shifted Transmitter," *IEEE Journal of Solid-State Circuits*, vol. 39, No. 8, pp. 1241-1252 (Aug. 2004).

Hammond, R. and Henry, J., "High Power Vector Summation Switching Power Amplifier Development," *IEEE Power Electronics Specialist Conference (PESC)*, pp. 267-272 (Jun. 29-Jul. 3, 1981).

Heiden, D., "Principle of a phase constant and low distortion amplitute modulation system for transistor transmitters," *Nachrichtentechnische Zeitschrift*, vol. 23, No. 12, pp. 608-612 (Dec. 1970).

Hetzel, S.A. et al., "LINC Transmitter," *Electronics Letters*, vol. 27, No. 10, pp. 844-846 (May 9, 1991).

Internet Postings at "Class E-AM Forum":: *View topic—What exactly is class D?*, at http://classe.monkeypuppet.com/viewtopic.php?t=220, 6 pages (Dec. 14-17, 2003).

Iwamoto, M. et al., "An Extended Doherty Amplifier with High Efficiency Over a Wide Power Range," *IEEE Transactions on Microwave Theory and Techniques*, vol. 49, No. 12, pp. 2472-2479 (Dec. 2001).

(56) References Cited

OTHER PUBLICATIONS

Jeong, Y.-C., *Linearizing Principles on High Power Amplifier*, Chonbuk National University School of Electronics & Information Engineering, 41 pages (Oct. 26, 2004).

Karn, P., Re: [amsat-bb] *AO-40 Satellite RF Architecture Question*, at http://www.uk/amsat.org/ListArchives/amsat-bb/2002/msg01409.html, 2 pages (Feb. 25, 2002).

Katz, A., *Linearization: Reducing Distortion in Power Amplifiers*, The College of New Jersey, 52 pages (Apr. 16, 2004).

Kannisto, R., "A Vector-Locked Loop for Power Amplifier Linearization," *IEEE MTI-S International Microwave Symposium Digest*, 4 pages (Jun. 6-11, 2004).

Kelly, W.M. et al., "Vector Modulator, Output Amplifier, and Multiplier Chain Assemblies for a Vector Signal Generator," *Hewlett-Packard Journal*, vol. 38, No. 11, pp. 48-52 (Dec. 1987).

Kenington, P.B. et al., "Broadband Linearisation of High-Efficiency Power Amplifiers," *Proceedings of the Third International Mobile Satellite Conference*, pp. 59-64 (1993).

Kim, I. et al., "The linearity and efficiency enhancement using 3-way Doherty amplifier with uneven power drive," *International Technical Conference on Circuit/Systems, Computers and Communications*, Jeju, Korea, pp. 369-370 (Jul. 2005).

Kim, J. et al., "Optimum Operation of Asymmetrical-Cells-Based Linear Doherty Power Amplifiers—Uneven Power Drive and Power Matching," *IEEE Transactions on Microwave Theory and Techniques*, vol. 53, No. 5, pp. 1802-1809 (May 2005).

Kosugi, H. et al., "A High-Efficiency Linear Power Amplifier Using an Envelope Feedback Method," *Electronics and Communications in Japan*, Part 2. vol. 77, No. 3, pp. 50-57 (1994).

Kurzrok, R., "Simple Lab-Built Accessories for RF, IF, Baseband and Audio," *High Frequency Electronics*, pp. 60-64 (May 2003).

Langridge, R. et al., "A Power Re-Use Technique for Improved Efficiency of Outphasing Microwave Power Amplifiers," *IEEE Transactions on Microwave Theory and Technique*, vol. 47, No. 8, pp. 1467-1470 (Aug. 1999).

Li, C. et al., "Optimal IDM-MISO Transmit Strategy with Partial CSI at Transmitter," 6 pages, downloaded Jun. 2006 from http://www288.pair.com/ciss/ciss/numbered/36.pdf.

Love, D.J. et al., "Grassmannian Beamforming for Multiple-Input Multiple-Output Wireless Systems," pp. 1-29, downloaded Jun. 2006 from http://www.math.ucdavis.edu/~strohmer/papers/2003/grassbeam.ps.gz, Jun. 3, 2003.

Lyles, J.T.M., [Amps] *Amplifiez [TSPA]*, at http://lists.contesting.com/pipermail/amps/2005-January/042303.html, 2 pages (Jan. 28, 2005).

*Manuals and Schematics*, at http://www.lks.net/~radio/Pages/manuals.htm, 8 pages (last update Aug. 23, 2005).

Masse, D., "Advanced Technique in RF Power Amplifier Design," *Microwave Journal (International Edition)*, vol. 45, Issue 9, p. 216 (Sep. 2002).

Masse, D., "Design of Linear RF Outphasing Power Amplifiers," *Microwave Journal (International Edition)*, vol. 47, Issue 7, p. 152 (Jul. 2004).

McCune, E., "High-Efficiency, Multi-Mode Multi-Band Terminal Power Amplifiers," *IEEE Microwave Magazine*, vol. 6, No. 1, pp. 44-55 (Mar. 2005).

McPherson, D.S. et al., "A 28 GHz HBT Vector Modulator and Its Application to an LMCS Feedforward Power Amplifier," *28th European Microwave Conference—Amsterdam*, vol. 1, pp. 523-528 (1998).

*Mead Education: Information Registration: RF Transceivers and Power Amplifiers*, at http://www.mead.ch/htm/ch/bios_texte/RF-PA_05_text.html, 3 pages (printed Sep. 1, 2005).

Morais, D.H. and Feher, K., "NLA-QAM: A Method for Generating High-Power QAM Signals Through Nonlinear Amplification," *IEEE Transactions on Communications*, vol. COM-30, No. 3, pp. 517-522 (Mar. 1982).

Moustakas, A.L. and Simon, S.H., "Optimizing multiple-input single-output (MISO) communication systems with general Gaussian channels: nontrivial covariance and nonzero mean," *IEEE Trans. on Information Theory*, vol. 49, Issue 10, pp. 2770-2780, Oct. 2003.

Musson, D.R., "Ampliphase . . . for Economical Super-Power AM Transmitters", *Broadcast News*, vol. No. 119, pp. 24-29 (Feb. 1964).

Norris, G.B. et al., "A Fully Monolithic 4-18 GHZ Digital Vector Modulator," *IEEE MIT-S International Microwave Symposium Diges*, pp. 789-792 (1990).

Olson, S.A. and Stengel, R.E., "LINC Imbalance Correction using Baseband Preconditioning," *Proceedings IEEE Radio Wireless Conference*, pp. 179-182 (Aug. 1-4, 1999).

Pereyra, L.A., "Modulation techniques for radiodiffusion transmitters," *Revista Telegrafica Electronics*, vol. 67, No. 801, pp. 1132-1138 and 1148 (Oct. 1979).

Pigeon, M., "A CBC Engineering Report: Montreal Antenna Replacement Project," *Broadcast Technology*, vol. 15, No. 4, pp. 25-27 (Jan. 1990).

Poitau, G. et al., "Experimental Characterization of LINC Outphasing Combiners' Efficiency and Linearity," *Proceedings IEEE Radio and Wireless Conference*, pp. 87-90 (2004).

Price, T.H., "The Circuit Development of the Ampliphase Broadcasting Transmitter," *The Proceedings of the Institution of Electrical Engineers*, vol. 101, pp. 391-399 (1954).

Qiu, R.C. et al., "Time Reversal with MISO for Ultra-Wideband Communications: Experimental Results (invited paper)," 4 pages, downloaded Jun. 2006 from http://iweb.intech.edu/rqiu/paper/conference/RWS06Qiu_TH2B1.pdf.

Raab, F.H. et al., "Power Amplifiers and Transmitters for RF and Microwave," *IEEE Transactions on Microwave Theory and Techniques*, vol. 50, No. 3, pp. 814-826 (Mar. 2002).

Raab, F.H. et al., "RF and Microwave Power Amplifier and Transmitter Technologies—Part 1," *High Frequency Electronics*, pp. 22, 24, 26, 28, 29, 30, 32, 34, and 36 (May 2003).

Raab, F.H. et al., "RF and Microwave Power Amplifier and Transmitter Technologies—Part 3," *High Frequency Electronics*, pp. 34, 36, 38, 40, 42-44, 46, and 48 (2003).

Raab, F.H. et al., "RF and Microwave Power Amplifier and Transmitter Technologies—Part 5," *High Frequency Electronics*, pp. 46, 48-50, 52, and 54 (2004).

Raab, F.H., "Efficiency of Doherty RF-Power Amplifier Systems," *IEEE Transactions on Broadcasting*, vol. BC-33, No. 3, pp. 77-83 (Sep. 1987).

Raab, F.H., "Efficiency of Outphasing RF Power-Amplifier Systems," *IEEE Transactions on Communications*, vol. COM-33, No. 10, pp. 1094-1099 (Oct. 1985).

Rabjohn, G. and Wight, J., "Improving Efficiency, Output Power with 802.11a Out-Phasing PAs," at http://www.us.design-reuse.com/articles/article6937.html, 8 pages (Jan. 9, 2004).

Rustako, A.J. and Yeh, Y.S., "A Wide-Band Phase-Feedback Inverse-Sine Phase Modulator with Application Toward a LINC Amplifier," *IEEE Transactions on Communications*, vol. COM-24, No. 10, pp. 1139-1143 (Oct. 1976).

Saleh, A.A.M. and Cox, D.C., "Improving the Power-Added Efficiency of FET Amplifiers Operating with Varying-Envelope Signals," *IEEE Transactions on Microwave Theory and Techniques*, vol. 31, No. 1, pp. 51-56 (Jan. 1983).

Saraga, W., "A new version of the out-phasing (quadrature-modulation) method for frequency translation (SSB generation and detection)," *Transmission Aspects of Communications Networks*, pp. 131-134 (1964).

Shi, B. and Sundström, L., "A 200-MHz IF BiCMOS Signal Component Separator for Linear LINC Transmitters," *IEEE Journal of Solid-State Circuits*, vol. 35, No. 7, pp. 987-993 (Jul. 2000).

Shi, B. and Sundström, L., "A Voltage-Translinear Based CMOS Signal Component Separator Chip for Linear LINC Transmitters," *Analog Integrated Circuits and Signal Processing*, 30, pp. 31-39 (2002).

Shi, B. and Sundström, L., "Investigation of a Highly Efficient LINC Amplifier Topology," *Proceedings IEEE 45th Vehicular Technology Conference*, vol. 2, pp. 1215-1219 (Oct. 7-11, 2001).

Shin, B. et al., "Linear Power Amplifier based on 3-Way Doherty Amplifier with Predistorter," *IEEE MTT-S International Microwave Symposium Digest*, pp. 2027-2030 (2004).

(56) References Cited

OTHER PUBLICATIONS

Simon, M. and Weigel, R., "A Low Noise Vector Modulator with integrated Basebandfilter in 120 nm CMOS Technology," 2003 *IEEE Radio Frequency Integrated Circuits Symposium*, pp. 409-412 (2003).
Skarbek, I. "New High-Efficiency 5-KW AM Transmitter 'Unique Class C Amplifier Operates with 90% Efficiency'," *RCE Broadcast News # 107*, pp. 8-13 (Mar. 1960).
Sokal, N. O., "RF Power Amplifiers, Classes A though S—How they Operate, and When to Use Each," *Electronics Industries Forum of New England, Professional Program Proceedings*, Boston, MA, pp. 179-252 (1997).
Staudinger, J. et al, "High Efficiency CDMA RF Power Amplifier Using Dynamic Envelope Tracking Technique," *IEEE MTT-S International Microwave Symposium Digest*, vol. 2, pp. 873-876 (Jun. 11-16, 2000).
Stengel, B. and Eisenstadt, W.R., "LINC Power Amplifier Combiner Method Efficiency Optimization," *IEEE Transactions on Vehicular Technology*, vol. 49, No. 1, pp. 229-234 (Jan. 2000).
Sundström, I., "Spectral Sensitivity of LINC Transmitters to Quadrature Modulator Misalignments," *IEEE Transactions on Vehicular Technology*, vol. 49, No. 4, pp. 1474-1487 (Jul. 2000).
Sundström, L., "Automatic adjustment of gain and phase imbalances in LINC transmitters," *Electronics Letters*, vol. 31, No. 3, pp. 155-156 (Feb. 2, 1995).
Sundström, L., "Effect of modulation scheme on LINC transmitter power efficiency," *Electronics Letters*, vol. 30, No. 20, pp. 1643-1645 (Sep. 29, 1994).
Sundström, L., "Effects of reconstruction filters and sampling rate for a digital signal component separator on LINC transmitter performances," *Electronics Letters*, vol. 31, No. 14, pp. 1124-1125 (Jul. 6, 1995).
Sundström, L., "The Effect of Quantization in a Digital Signal Component Separator for LINC Transmitters," *IEEE Transactions on Vehicular Technology*, vol. 45, No. 2, pp. 346-352 (May 1996).
Sundström, L., *Digital RF Power Amplifier Linearisers Analysis and Design*, Department of Applied Electronics, Lund University, pp. i-x and 1-64 (1995).
Tan, J.S. and Gardner, P., "A LINC Demonstrator Based on Switchable Phase Shifters," *Microwave and Optical Technology Letters*, vol. 35, No. 4, pp. 262-264 (Nov. 20, 2002).
Tehamov, N. T., *Power Amplifiers*, Tampere University of Technology, Institute of Communications Engineering, RF-ASIC Laboratory, 26 pages (May 17, 2004).
*TDP: RCA BHF-100A*, at http://www.transmitter.be/rea-bhf100a.html, 8 pages (printed Jun. 15, 2005).
*The Ampliphase Ancestry*, at http://www.rossrevenge.co.uk/tx/ancest.htm, 8 pages, (latest update Aug. 2002).
Tomisato, S. et al., "Phase Error Free LINC Modulator," *Electronics Letters*, vol. 25, No. 9, pp. 576-577 (Apr. 27, 1989).
Ullah, I., "Exciter Modulator for an Ampliphase Type Broadcast Transmitter," *ABU Technical Review*, No. 62, pp. 21-27 (May 1979).
Ullah, I., "Output Circuit of an Ampliphase Broadcast Transmitter," *ABU Technical Review*, No. 63, pp. 17-24 (Jul. 1979).
Vasyukov, V.V. et al., "The Effect of Channel Phase Asymmetry on Nonlinear Distortions in Modulation by Dephasing," *Readioelectronics and Communications Systems*, vol. 28, No. 4, pp. 86-87 (1985).
Venkataramani, M., *Efficiency Improvement of WCDMA Base Station Transmitters using Class-F power amplifiers*, Thesis, Virginia Polytechnic Institute, Blacksburg, Virginia, pp. i-xi and 1-55 (Feb. 13, 2004).
Virmani, B.D., "Phase-to-amplitude modulation," *Wireless World*, vol. 61, No. 4, pp. 183-187 (Apr. 1955).
Wang F. et al., "Envelope Tracking Power Amplifier with Pre-Distortion Linearization for WLAN 802.11g," *2004 IEEE MTT-S International Microwave Symposium Digest*, vol. 3, pp. 1543-1546 (Jun. 6-11, 2004).

Whitaker, Jerry C., *Power Vacuum Tubes Handbook* (*Electronics Handbook Series*), CRC Publishing, ISBN No. 0849313457, pp. 236-238 (May 1999).
Wight, J., "Computational microwave circuits arrive," at http://www.eetimes.com/showArticle.ihtml?articleID=18900752, EE Times, 3 pages (Apr. 12, 2004).
Wilds, R.B., "An S-Band Two-Phase Demodulator," pp. 48-53 (Aug. 1958).
Woo, Y.Y. et al., "SDR Transmitter Based on LINC Amplifier with Bias Control," *IEEE MITT-S International Microwave Symposium Digest*, pp. 1703-1706 (2003).
Ya, S. et al., "A C-Band Monolithic Vector Modulator," *Research & Progress of SSE*, vol. 14, No. 4, pp. 302-306 (Nov. 1994).
Yang, Y. et al., "A Fully Matched N-Way Doherty Amplifier With Optimized Linearity," *IEEE Transactions on Microwave Theory and Techniques*, vol. 51, No. 3, pp. 986-993 (Mar. 2003).
Yang, Y. et al., "A Microwave Doherty Amplifier Employing Envelope Tracking Technique for High Efficiency and Linearity," *IEEE Microwave and Wireless Components Letters*, vol. 13, No. 9, pp. 370-372 (Sep. 2003).
Yang, Y. et al., "Experimental Investigation on Efficiency and Linearity of Microwave Doherty Amplifier," IEEE, 4 pages (2001).
Yang, Y. et al., "Optimum Design for Linearity and Efficiency of a Microwave Doherty Amplifier Using a New Load Matching Technique," *Microwave Journal*, 8 pages (Dec. 1, 2001).
Yankin, V. A., "Effect of quantization, amplifier noise and the parameters of the calibration elements on the accuracy of measurement using a six-port microwave amplaphasemeter," *Radioelectronics and Communication Systems*, vol. 32, No. 8, pp. 110-112 (1989).
Yao, J. and Long, S.I., "High Efficiency Switching-Mode Amplifier for Mobile and Base Station Applications," Final Report 2002-03 for MICRO Project 02-044, 4 pages (2002-2003).
Yao, J. et al., "High Efficiency Switch Mode Amplifiers for Mobile and Base Station Applications," Final Report 2000-2001 for MICRO Project 00-061, 4 pages (2000-2001).
Yi, J. et al., "Effect of efficiency optimization on linearity of LINC amplifiers with CDMA signal," *IEEE MTT-S International Microwave Symposium Digest*, vol. 2, pp. 1359-1362 (May 2001).
Zhang, X., *An Improved Outphasing Power Amplifier System for Wireless Communications*, Dissertation, University of California, San Diego, pp. i-xvii and 1-201 (2001).
Zhang, X. and Larson, L.E., "Gain and Phase Error-Free LINC Transmitter," *IEEE Transactions on Vehicular Technology*, vol. 49, No. 5, pp. 1986-1994 (Sep. 2000).
Zhang, X. et al. "Gain/Phase Imbalance-Minimization Techniques for LINC Transmitters," *IEEE Transactions on Microwave Theory and Techniques*, vol. 49, No. 12, pp. 2507-2516 (Dec. 2001).
Zhang, X. et al., "A Gain/Phase Imbalance Minimization Technique for LINC Transmitter," *IEEE MTT-S International Microwave Symposium Digest*, pp. 801-804 (2001).
Zhang, X. et al., "Analysis of Power Recycling Techniques for RF and Microwave Outphasing Power Amplifiers," *IEEE Transactions on Circuits and Systems II: Analog and Digital Signal Processing*, vol. 49, No. 5, p. 312-320 (May 2002).
Zhang, X. et al., "Calibration scheme for LINC transmitter," *Electronics Letters*, vol. 37, No. 5, pp. 317-318 (Mar. 1, 2001).
Zhang, X. et al., *Design of Linear RF Outphasing Power Amplifiers*, entire book, Artech House, ISBN No. 1-58053-374-4 (2003).
Zhong, S.S. and Cui, J.H., "A New Dual Polarized Aperature-Coupled Printer Array for SAR Applications," *Journal of Shanghai University (English Edition)*, vol. 5, No. 4, pp. 295-298 (Dec. 2001).
English Abstract for European Patent Publication No. EP 0 639 307 B1, published Feb. 22, 1995, downloaded from http://v3.espacenet.com, 1 page.
English Abstract for European Patent Publication No. EP 0 708 546 A2, published Apr. 24, 1996, downloaded from http://v3.espacenet.com, 1 page.
English Abstract for European Patent Publication No. EP 0 892 529 A2, published Jan. 20, 1999, downloaded from http://v3.espacenet.com, 1 page.
English Abstract for Japanese Patent Publication No. JP 60-63517 A, published Apr. 11, 1985, downloaded from http://v3.espacenet.com, 1 page.

(56) References Cited

OTHER PUBLICATIONS

Englis Abstract for Japanese Patent Publication No. JP 2-87708 A, published Feb. 28, 1990, downloaded from http://v3.espacenet.com, 1 page.
English Abstract for Japanese Patent Publication No. JP 3-232307 A, published Oct. 16, 1991, downloaded from http://v3.espacenet.com, 1 page.
English Abstract for Japanese Patent Publication No. JP 5-22046 A, published Jan. 29, 1993, downloaded from http://v3.espacenet.com, 1 page.
English Abstract for Japanese Patent Publication No. JP 6-338738 A, published Dec. 6, 1994, downloaded from http://v3.espacenet.com, 1 page.
English Abstract for Japanese Patent Publication No. JP 10-70451 A, published March 19, 1998, downloaded from http://v3.espacenet.com, 1 page.
English Abstract for Japanese Patent Publication No. JP 2001-136057 A, published May 18, 2001, downloaded from http://v3.espacenet.com, 1 page.
English Abstract for Japanese Patent Publication No. JP 2004-260707 A, published Sep. 16, 2004, downloaded from http://v3.espacenet.com, 1 page.
English Translation for Romanian Patent Publication No. RO 100466, published Aug. 20, 1992, obtained from Transperfect Translations, 4 pages.
English Abstract for Romanian Patent Publication No. RO 102824, published Nov. 19, 2001, downloaded from http://v3.espacenet.com, 1 page.
English Translation for Russian Patent Publication No. SU 1322183 A1, published Jul. 7, 1987, obtained from Transperfect Translation, 2 pages.
Notification of Transmittal of the International Search Report and Written Opinion, dated Mar. 4, 2008, for PCT Application No. PCT/US07/06197, 8 pages.
Notification of Transmittal of the International Search Report and Written Opinion, dated Aug. 15, 2008, for PCT Application No. PCT/US08/06360, 6 pages.
Notification of Transmittal of the International Search Report and Written Opinion, dated Sep. 3, 2008, for PCT Application No. PCT/US2008/008118, 6 pages.
Notification of Transmittal of the International Search Report and Written Opinion, dated Sep. 8, 2008, for PCT Application No. PCT/US2008/007623, 6 pages.
Silverman, L., and Del Plato, C., "Vector Modulator Enhances Feedforward Cancellation," *Microwaves & RF*, pp. 1-4 (Mar. 1998).
Notification of Transmittal of the International Search Report and Written Opinion, dated Jul. 7, 2009, for PCT Application No. PCT/US09/03212, 6 pages.
Jang, M. et al., "Linearity Improvement of Power Amplifier Using Modulation of Low Frequency IMD Signals," *Asia-Pacific Microwave Conference Proceedings*, vol. 2, pp. 1156-1159, Dec. 4-7, 2005.
Woo, W. et al., "A Hybrid Digital/RF Envelope Predistortion Linearization System for Power Amplifiers," *IEEE Transactions on Microwave Theory and Techniques*, vol. 53, No. 1, pp. 229-237, Jan. 2005.
Notification of Transmittal of the International Search Report and Written Opinion, dated Apr. 27, 2010, for PCT Application No. PCT/US2009/057306, 11 pages.
English Abstract for Japanese Patent Publication No. JP 2005-151543 A, published Jun. 9, 2005, downloaded from http://v3.espacenet.com, 1 page.

English Abstract for Japanese Patent Publication No. JP 1-284106 A, published Nov. 15, 1989, downloaded from http://v3.espacenet.com, 1 page.
English Abstract for Japanese Patent Publiction No. JP 4-095409 A, published Mar. 27, 1992, downloaded from http://v3.espacenet.com, 1 page.
English Abstract for Japanese Patent Publication No. JP 4-104604 A, published Apr. 7, 1992, downloaded from http://v3.espacenet.com, 1 page.
English Abstract for Japanese Patent Publication No. JP 9-018536 A, published Jan. 17, 1997, downloaded from http://v3.espacenet.com, 1 page.
English Abstract for Japanese Patent Publication No. JP 9-074320 A, published Mar. 18, 1997, downloaded from http://v3.espacenet.com, 1 page.
English Abstract for Japanese Patent Publication No. JP 2000-209291 A, published Jul. 28, 2000, downloaded from http://v3.espacenet.com, 1 page.
English Abstract for Japanese Patent Publication No. JP 2003-298357 A, published Oct. 17, 2003, downloaded from http://v3.espacenet.com, 1 page.
English Abstract for Japanese Patent Publication No. JP 2000-244261 A, published Sep. 8, 2000, downloaded from http://worldwide.espacenet.com, 1 page.
English Abstract for Japanese Patent Publication No. JP 2001-217659 A, published Aug. 10, 2001, downloaded from http://worldwide.espacenet.com, 1 page.
English Abstract for Japanese Patent Publication No. JP 2001-308650 A, published Nov. 2, 2001, downloaded from http://worldwide.espacenet.com, 1 page.
English Abstract for Japanese Patent Publication No. JP 2002-543729 A, published Dec. 17, 2002, downloaded from http://worldwide.espacenet.com, 1 page.
English Abstract for Japanese Patent Publication No. JP 5-037263 A, published Feb. 12, 1993, downloaded from http://worldwide.espacenet.com, 1 page.
English Abstract for Japanese Patent Publication No. JP 2005-101940 A, published Apr. 14, 2005, downloaded from http://worldwide.espacenet.com, 1 page.
Notification of Transmittal of the International Search Report and Written Opinion, dated Aug. 14, 2012, for PCT Appl. No. PCT/US2012/032791, 7 pages.
Harlan, G. et al, "Dynamically-Configurable Multimode Transmitter Systems for Wireless Handsets, Cognitive Radio and SDR Applications," *IEEE International Conference on Microwaves, Communications, Antennas and Electronics Systems*, Nov. 9, 2009, pp. 1-5.
Rawlins, G. and Sorrells, D., "A Thermodynamic Theory of RF Power Transmitters with an Example," *IEEE 10th Annual Wireless and Microwave Technology Conference*, Apr. 20, 2009, pp. 1-5.
Rawlins, G. et al., "Using an IQ Data to RF Power Transmitter to Realize a Highly-Efficient Transmit Chain for Current and Next-Generation Mobile Handsets," *Proceedings of the 38th European Microwave Conference*, Oct. 27, 2008, pp. 579-582.
Notification of Transmittal of the International Search Report and Written Opinion, dated Dec. 14, 2012, for PCT Appl. No. PCT/US2012/040500, 9 pages.
English Abstract for Japanese Patent Publication No. JP H08-163189 A, published Jun. 21, 1996, downloaded from http://worldwide.espacenet.com, 2 pages.
English Abstract for Japanese Patent Publication No. JP 2003-298361 A, published Oct. 17, 2003, downloaded from http://worldwide.espacenet.com, 2 pages.

\* cited by examiner

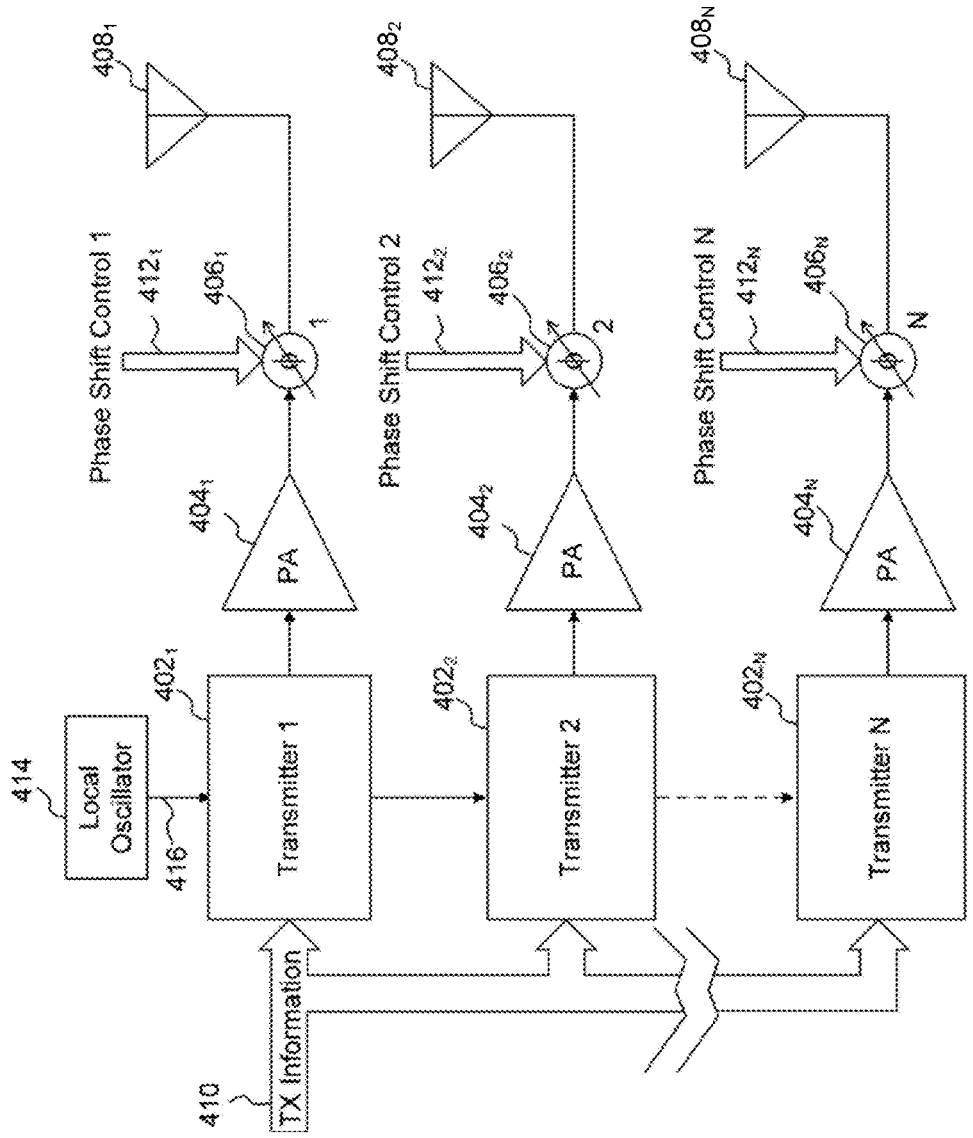
FIG. 4
(Conventional)

ANTENNA CONTROL

CROSS-REFERENCE TO RELATED APPLICATIONS

This application is a continuation of U.S. patent application Ser. No. 13/487,956, filed Jun. 4, 2012, titled "Antenna Control," now allowed, which claims the benefit of U.S. Provisional Patent Application No. 61/492,576, filed Jun. 2, 2011, titled "Transmit Antenna Multi-Element Control," which are both incorporated herein by reference in its entireties.

The present application is related to U.S. patent application Ser. No. 11/256,172, filed Oct. 24, 2005, now U.S. Pat. No. 7,184,723; U.S. patent application Ser. No. 11/508,989, filed Aug. 24, 2006, now U.S. Pat. No. 7,355,470; U.S. patent application Ser. No. 12/236,079, filed Sep. 23, 2008, now U.S. Pat. No. 7,911,272; U.S. patent application Ser. No. 09/590,955, filed Jul. 25, 2006, now U.S. Pat. No. 7,082,171; U.S. patent application Ser. No. 12/014,461, filed Jan. 15, 2008, now U.S. Pat. No. 7,554,508; and, U.S. patent application Ser. No. 13/442,706, filed Apr. 9, 2012, titled "Systems and Methods of RF Power Transmission, Modulation, and Amplification," all of which are incorporated herein by reference in their entireties.

BACKGROUND

1. Field

Embodiments of the present invention generally relate to electronically configurable and controllable antenna elements. More particularly, embodiments of the present invention relate to the control and configuration of amplitude and/or phase parameters of individual antenna elements such as, for example and without limitation, antenna elements of multi-element antenna arrays, multi-element electronically steerable antennas (MESAs), and the combination of MESAs with multiple-input multiple-output (MIMO) antenna technology.

2. Background

Generally, antennas can be classified into three categories: omni-directional, semi-directional, and highly-directional antennas. These three general antenna categories have different electromagnetic signal directional and gain characteristics (often referred to as "directivity"). Antenna directivity can be defined as the ratio of radiation intensity in the direction of the antenna's peak intensity or the desired direction of operation to the average radiation intensity in all other directions (e.g., total integrated power in all directions captured by the denominator of the ratio which includes the direction of interest). In addition to directivity, antennas are characterized by a radiation pattern, which can be either a two-dimensional or three-dimensional graphical plot of the antenna's signal intensity versus a reference angle.

Omni-directional antennas can have a broad radiation pattern and transmit and receive electromagnetic signals nearly uniformly in all directions. Examples of omni-directional antennas include dipoles, discones, masks, and loops. Semi-directional antennas are capable of focusing desired energy and signals in a desired direction. Examples of semi-directional antennas include patch antennas, panel antennas (both patch and panel antennas are also referred to as "planar antennas"), and Yagi antennas (e.g., a directional antenna having a horizontal conductor with several insulated dipoles parallel to and in the plane of the conductor).

Semi-directional antennas offer improved gain over omni-directional antennas in the desired direction of operation while reducing the gain of and/or potential interference from signals in other directions. As noted above, these characteristics of semi-directional antennas are referred to as directivity. Highly-directional antennas provide a smaller angle of radiation in the desired direction of operation, a more focused beam, and a narrower beam width compared to the above-described general antenna types. Examples of highly-directional antennas include parabolic dish, fixed arrays, and grid antennas (a grid antenna resembles, for example, a rectangular grill of a barbecue with edges slightly curved inward. The spacing of the wires on a grid antenna is determined by the designed operational wavelength of the antenna.).

All three of the above-described general antenna types (i.e., omni-directional, semi-directional, and highly-directional antennas) can also be classified as fixed antenna designs. A fixed antenna design is one that has a fixed gain, a fixed radiation pattern (e.g., fixed directionality), and a fixed direction of operation. An example of a fixed, highly-directional antenna is the parabolic dish antenna, which is commonly used in satellite communications. The parabolic dish antenna includes a reflector that is sized to produce the desired antenna gain and beam width for a specific radiation pattern and can be oriented in the desired direction of operation.

While particularly suitable for fixed gain, fixed location, fixed distance, and fixed direction communication systems, fixed antenna designs are not particularly suitable for applications requiring variable direction and/or variable gain. For example, the gain and radiation pattern of a parabolic dish antenna are fixed based on the size and design of the dish's reflector, and the direction of operation can only be changed by changing the dish's physical orientation. These disadvantages and limitations of static parabolic dish antennas apply to most fixed antenna designs.

An antenna design that offers advantages over the aforementioned limitations of fixed antenna designs is a multi-element electronically steerable antenna (MESA). This type of antenna can be utilized either in a fixed location or in a portable (or mobile) environment. A single MESA can be designed to produce omni-directional, semi-directional, and highly-directional antenna radiation patterns or directivity. The directivity and gain of the MESA are determined by the number of antenna array elements and the ability to determine and control the relative phase shifts and/or amplitudes between antenna array elements.

A MESA can electronically change its gain and radiation pattern (e.g., directivity), as well as its direction of operation, by varying the relative phase shift and/or amplitude of its antenna array elements. Furthermore, a MESA does not require any mechanical components, such as a motor or a servometer, to charge its direction of operation, its gain, or its radiation pattern. This allows both its size and weight to be reduced, making the MESA an ideal candidate for portable (or mobile) communication systems. Additionally, because the MESA operational parameters can be modified electronically, the direction of operation of the MESA can be changed more rapidly than a fixed antenna design, making the MESA a good antenna technology to locate, acquire, and track fast moving signals.

Conventional MESA arrays use variable phase shifters (e.g., time delay phase shifters, vector modulators, and digital phase shifters) to control directivity. The input dynamic range and resolution of such phase shifters, however, is limited, which limits the accuracy at which a determined configuration of relative phase shifts can be set. In turn, this limits the accuracy of the resulting beam steering angle of the antenna array and the suitability of the antenna array for certain applications (e.g., high mobility applications). Increasing the number of antenna elements of the array typically allows greater accuracy of beam steering angle but comes with an increased footprint and cost.

SUMMARY

Therefore, an antenna design is needed for variable directivity and variable gain, while minimizing the footprint, cost, and power consumption associated with the antenna design. Embodiments of the present invention generally relate to electronically configurable and controllable antenna elements.

An embodiment of the present invention includes an apparatus for transmitting an output signal. The apparatus can include a synthesis engine, a power supply and a multiple input single output (MISO) operator. The synthesis engine is configured to generate amplitude control signals, phase control signals and power supply control signals based on command and control information. The power supply is configured to receive the power supply control signals and to generate a power supply signal. Further, the MISO operator is configured to generate the output signal with an amplitude or a phase controlled by at least one of the amplitude control signals, the phase control signals and the power supply signal.

Another embodiment of the present invention includes a method for transmission. The method includes the following: generating amplitude control signals, phase control signals and power supply control signals based on command and control information; receiving the power supply control signals to generate a power supply signal; and generating, with a multiple input single output (MISO) operator, an output signal with an amplitude or a phase controlled by at least one of the amplitude control signals, the phase control signals and the power supply signal.

A further embodiment of the present invention includes a system for transmission. The system includes an energy converter, a local oscillator and an antenna. The energy converter can include a synthesis engine, a power supply and a multiple input single output (MISO) operator. The synthesis engine is configured to generate amplitude control signals, phase control signals and power supply control signals based on command and control information. The power supply is configured to receive the power supply control signals and to generate a power supply signal. Further, the MISO operator is configured to generate the output signal with an amplitude or a phase controlled by at least one of the amplitude control signals, the phase control signals and the power supply signal. The local oscillator is configured to provide a reference signal to the energy converter. Further, the antenna is configured to transmit the output signal.

Further embodiments, features, and advantages of the present invention, as well as the structure and operation of the various embodiments of the present invention, are described in detail below with reference to the accompanying drawings. It is noted that the invention is not limited to the specific embodiments described herein. Such embodiments are presented herein for illustrative purposes only. Additional embodiments will be apparent to a person skilled the relevant art based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

FIG. 4 illustrates a conventional multi-element transmit antenna array.

Embodiments of the present invention will be described with reference to the accompanying drawings. Generally, the drawing in which an element first appears is typically indicated by the leftmost digit(s) in the corresponding reference number.

DETAILED DESCRIPTION

1. Energy Converter

Figure 1A:
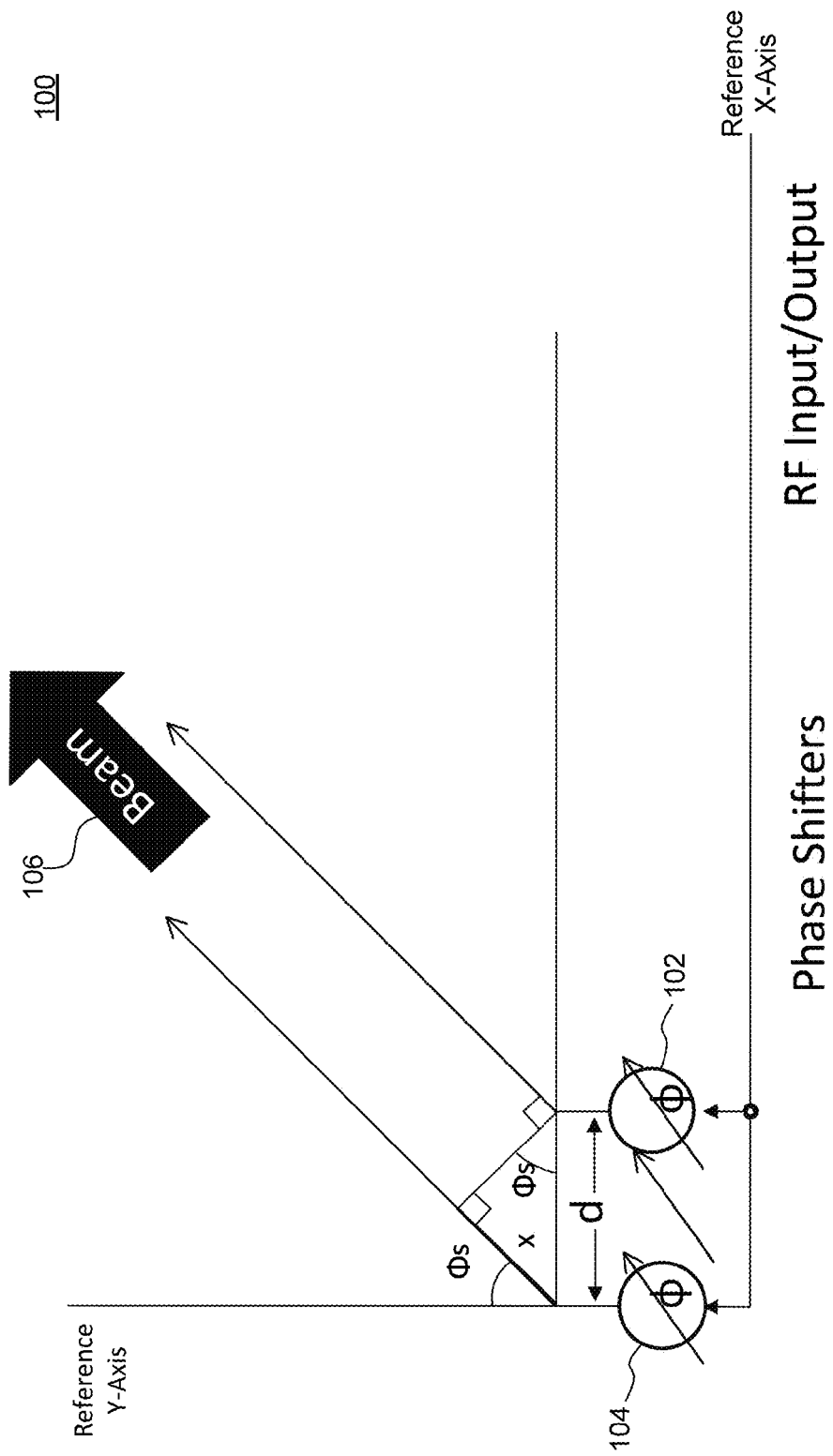
FIGS. 1A and 1B illustrate a two-element antenna array beam steering example.

The term "energy converter" is used throughout the specification. In an embodiment, an energy converter is an apparatus configured to convert energy from a potential energy (e.g., AC or DC power source) to a radio frequency (RF) signal by controlling a dynamic impedance at a trans-impedance node, thus resulting in a variable dynamic loadline. Examples of energy converters are described in the U.S. patents cross-referenced above, which are incorporated by reference herein in their entireties. For example, as described in at least one of the U.S. patents cross-referenced above, an energy converter based transmitter enables highly linear and efficient generation of desired waveforms over a wide range of output power. This highly linear and efficient energy converter is aided by amplitude and/or phase control mechanisms which can be applied at various stages of an energy converter based transmitter. For example, amplitude and/or phase control can be generated by digital control circuitry (in some embodiments, also referred to herein as a "Vector Synthesis Engine" (VSE)) and applied to multiple input multiple output (MISO) operator circuitry of the energy converter based transmitter. Amplitude and/or phase control signals may in turn be aided by various circuit and system characterization, circuit and/or system calibration and/or feedback (e.g., measurement and correction) mechanisms to ensure high amplitude/phase accuracy at the output of the energy converter.

In an embodiment, the MISO operator may be configured to control the impedance between a potential energy source and RF output circuitry to create a desired RF signal at a desired output power. In an embodiment, the multiple control inputs to the MISO operator may be control paths partitioned to control upper branch and lower branch circuitry. Alternatively, the multiple inputs to the MISO operator may control a single branch with multiple control paths. The control paths that serve as inputs to the MISO operator may be directly or indirectly utilized by the MISO operator to control a complex impedance of a trans-impedance node. Each baseband information input sample to the MISO operator may have a corresponding complex impedance value at the trans-impedance node, according to an embodiment of the present invention. The MISO operator and corresponding MISO circuitry may be considered as applying a mathematical "function" or "operation" such that the impedance at the transimpedance node can be varied based on the amplitude and phase control signals (e.g., inputs to the MISO operator).

In an embodiment, an energy converter can convert electrical energy of one type to electrical energy of another type. The statistics of an input potential energy to the energy converter can be different from the statistics of output energy from the energy converter, according to an embodiment of the present invention. Accordingly, multiple forms of electrical energy (e.g., AC or DC energy) can be consumed at the input of the energy converter and modulated to produce a desired modulated RF carrier at the output of the energy converter.

The above description of "energy converter" contrasts characteristics of a traditional amplifier. For example, as would be understood by a person skilled in the relevant art, a traditional amplifier is not designed to accept an input that possesses an arbitrary statistic with respect to an output of the amplifier. Rather, traditional amplifiers are typically designed to reproduce the essential statistic of the input—including voltage, current, and frequency—at its output with additional power increase due to a power supply of the amplifier that is consumed during the amplification process.

Further, for traditional amplifier designs, the input to the amplifier must possess a carrier frequency consistent with the output of the amplifier and the cross-correlation of the input and output should be as close to 1 as possible or meet minimum output waveform requirements of the amplifier. For example, a traditional amplifier requires a modulated RF carrier signal to be coupled to its input and an amplified version of the input modulated RF carrier signal at the output. This requirement is in addition to accounting for noise and non-linearities in the amplifier design.

2. Beam Steering in a Multi-Element Antenna Array

In this section, beam steering in a multi-element antenna array is described. As an example, FIGS. 1A and 1B conceptually illustrate beam steering in an example two-element antenna array 100. Antenna array 100 may be a transmit or receive antenna. As shown in FIG. 1A, antenna array 100 includes first and second variable phase shifters 102 and 104 that respectively control the phases of the first and second antenna elements (not shown in FIG. 1A) of antenna array 100.

The main beam steering angle (measured relative to a reference Y-axis) of antenna array 100 (which determines the direction of operation of the antenna) is a function of the relative phase shift (which will be denoted as "$\Delta\Phi$" herein) between the first and second antenna elements. In FIG. 1A, the main beam steering angle is denoted by the symbol "$\Phi_S$."

It can be shown that the main beam steering angle of antenna array 100 and the relative phase shift between the first and second antenna elements of antenna array 100 are related by the following equation:

$$\frac{360}{\Delta\Phi} = \frac{\lambda}{x} \tag{1}$$

where x is the distance labeled "x" in FIG. 1A, and $\lambda$ is the wavelength of the transmitted/received beam.

From FIG. 1A, the distance between the first and second antenna elements of antenna array 100 (denoted as "d" in FIG. 1A) is related to "x" according to:

$$x = d * \sin(\Phi_S). \tag{2}$$

Thus, by substitution, the relative phase shift between the first and second antenna elements of antenna array 100 can be written as a function of the main beam steering angle of the array as:

$$\Delta\Phi = \frac{360 * d * \sin(\Phi_s)}{\lambda}. \tag{3}$$

Figure 1B:
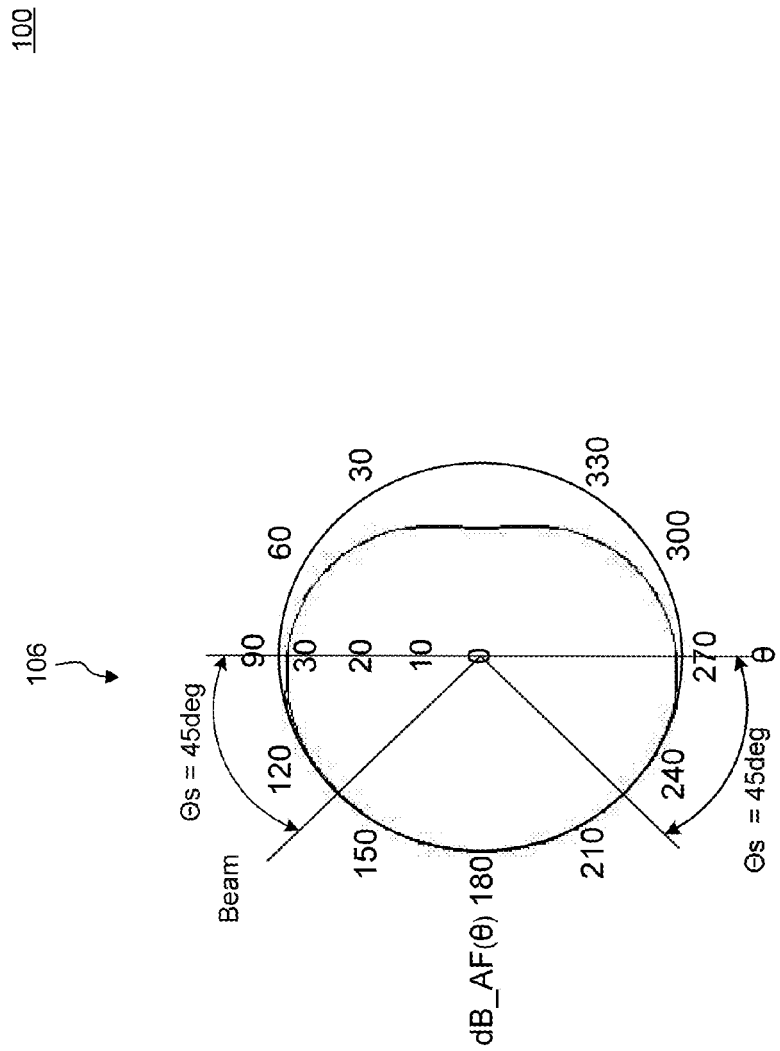

As a numerical example, assume that the RF output frequency of antenna array 100 is 3 GHz (which corresponds to a wavelength ($\lambda$)=9.993 cm), that the distance between the first and second antenna elements (d) is 2.5 cm, and that the desired beam steering angle ($\Phi_S$) is 45 degrees. Substituting these numerical values into equation (3) above results in a relative phase shift between the first and second antenna elements ($\Delta\Phi$) of approximately 63.684 degrees. An antenna array beam 106 that results from this example is illustrated in FIG. 1B.

Figure 2A:
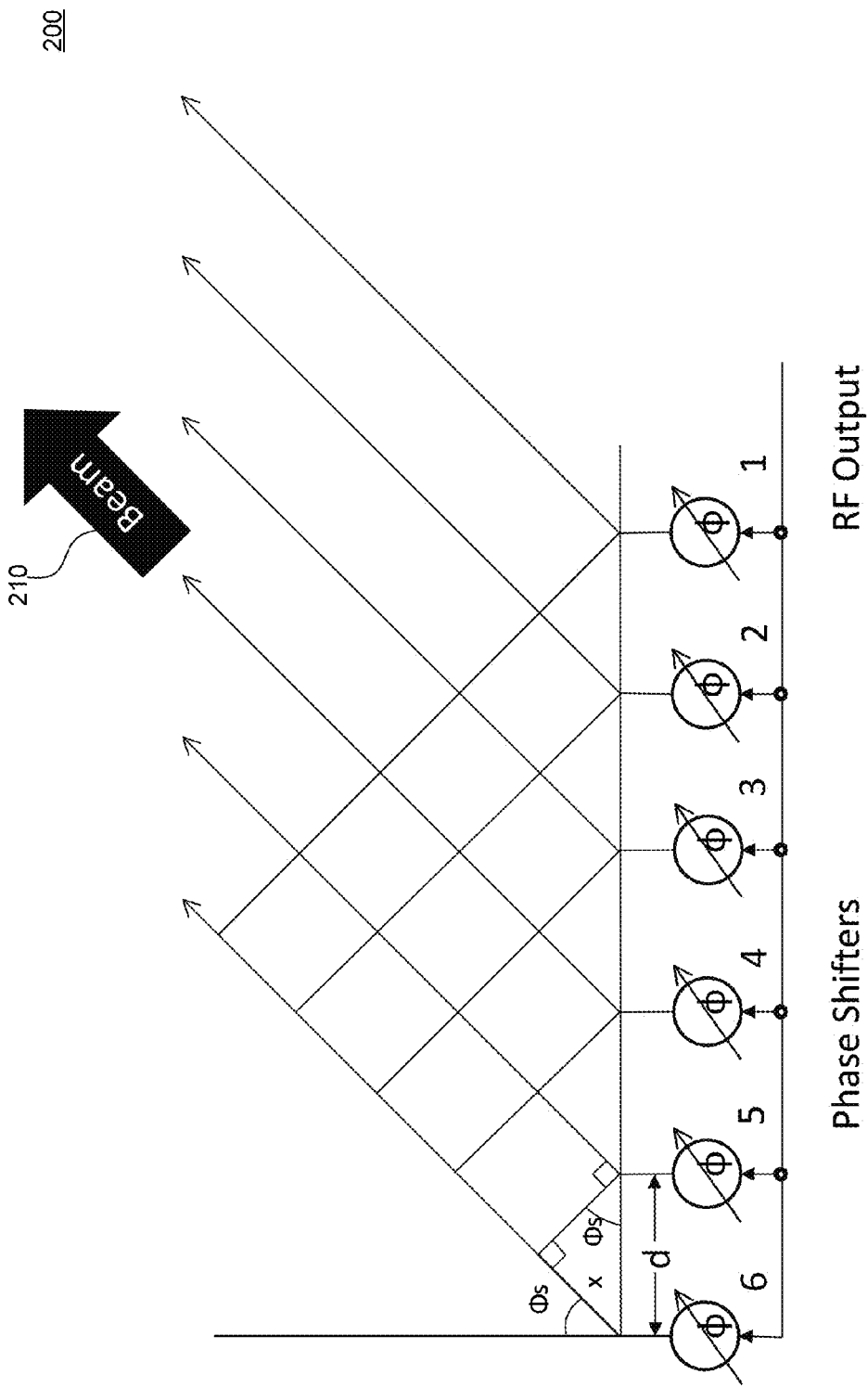
FIGS. 2A and 2B illustrate a six-element antenna array beam steering example.
Figure 2B:
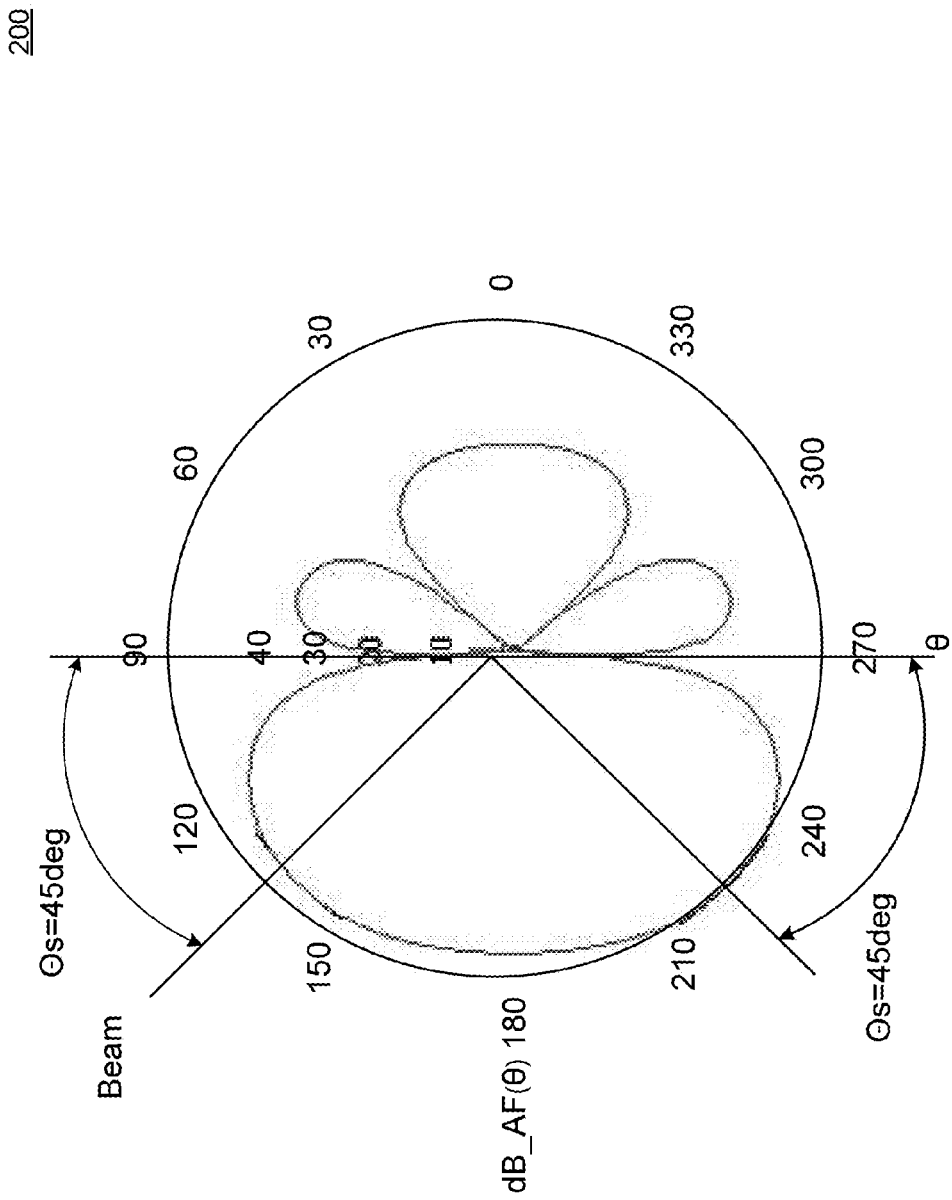

FIG. 2A conceptually illustrates beam steering in an example six-element antenna array 200. FIG. 2B illustrates an example beam 210 produced by antenna array 200 for a beam steering angle ($\Phi_S$) of 45 degrees. Like example two-element antenna array 100, the beam steering angle ($\Phi_S$) of antenna array 200 is a function of the relative phase shifts between successive antenna elements of the array.

Figure 3A:
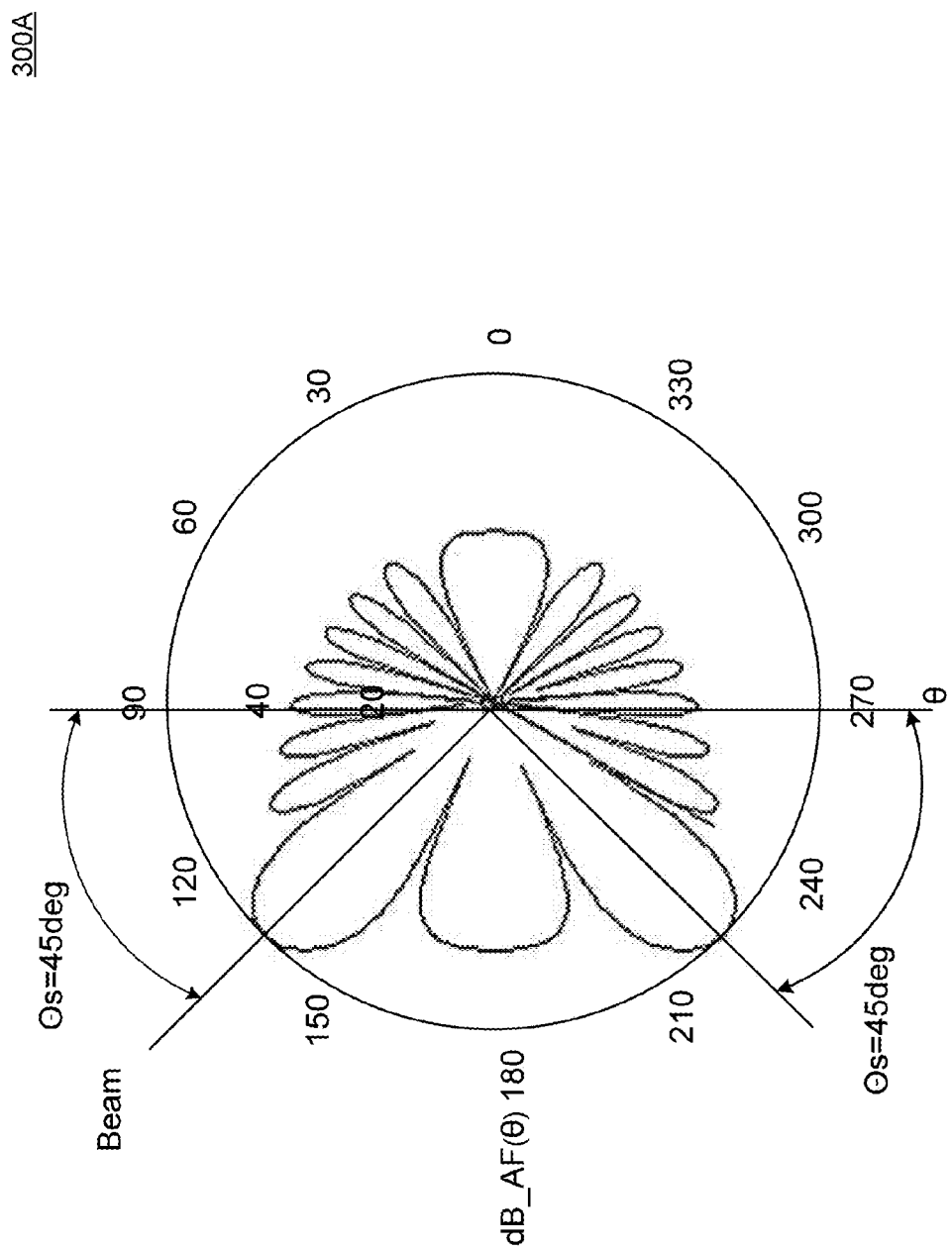
FIGS. 3A-3C illustrate exemplary beams of a 20-element antenna array for different main beam steering angle values.
Figure 3B:
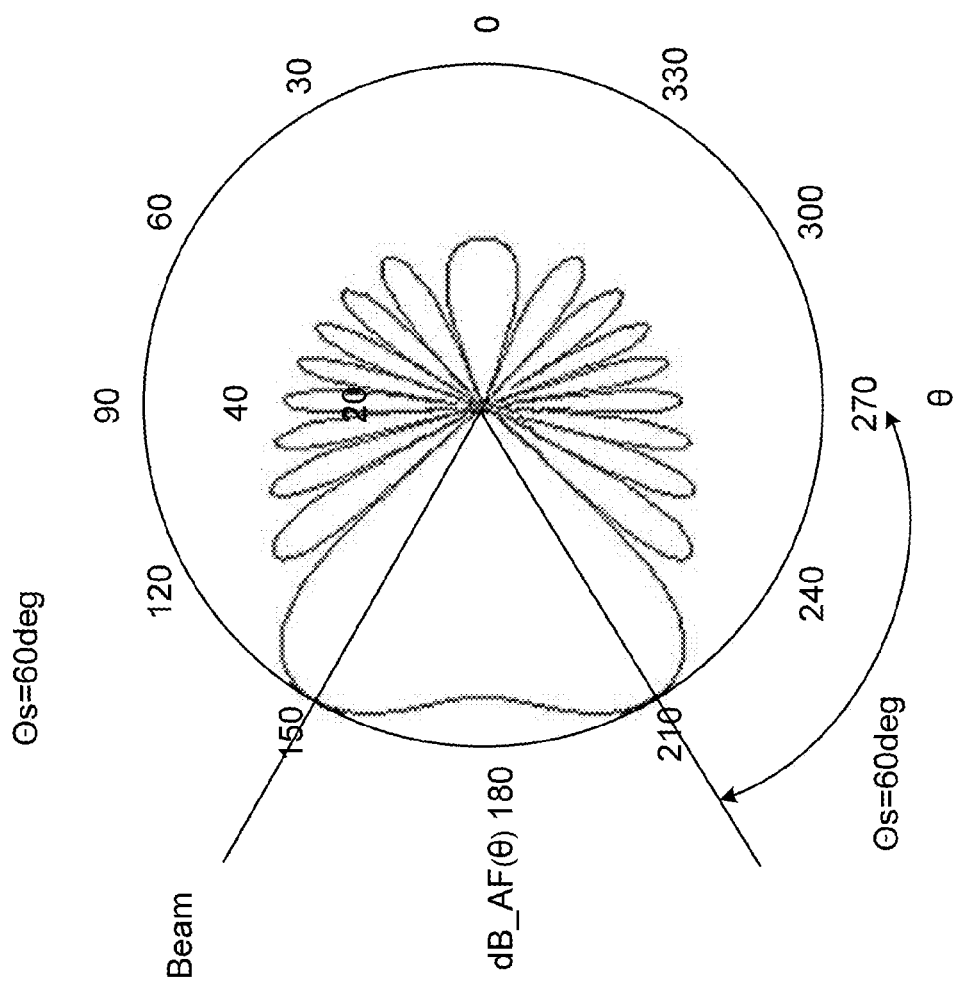
Figure 3C:
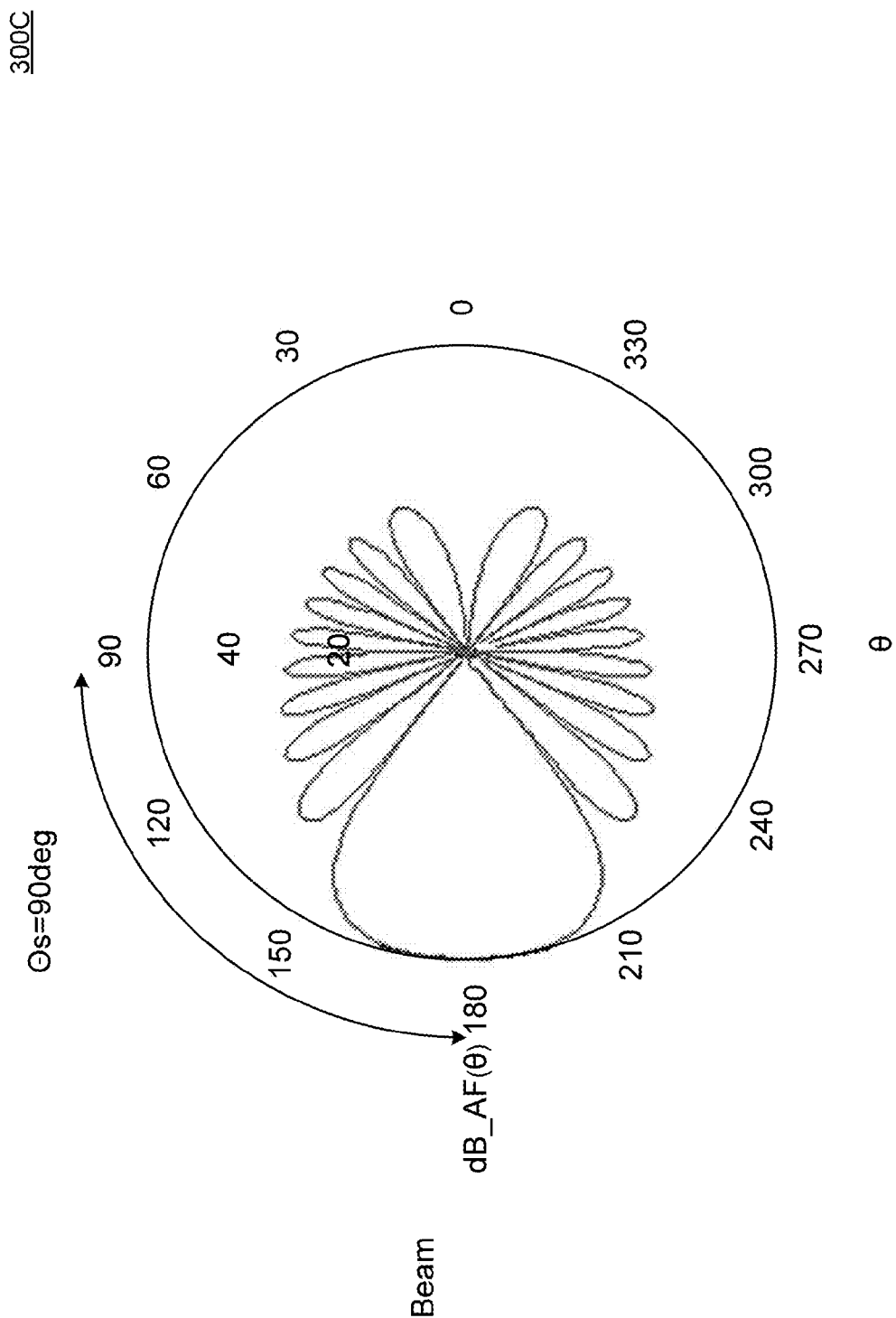

FIGS. 3A-3C illustrate example beam patterns of a 20-element antenna array for different main beam steering angle values. Specifically, FIGS. 3A, 3B, and 3C respectively show example antenna array beam patterns 300A, 300B, and 300C produced using the 20-element antenna array for beam steering angles ($\Phi_S$) of 45 degrees, 60 degrees, and 90 degrees, respectively. As shown in FIGS. 3A-3C, the directivity of the 20-element antenna array (e.g., gain in the desired direction and/or attenuation of potential interference from signals in other directions) is at a maximum at the selected beam steering angle ($\Phi_S$).

3. Conventional Multi-Element Antenna Array

FIG. 4 illustrates a conventional multi-element transmit antenna array 400. As shown in FIG. 4, conventional multi-element array 400 includes a plurality (N) of signal paths, each including a transmitter $402_1$-$402_N$, a power amplifier (PA) $404_1$-$404_N$, a variable phase shifter $406_1$-$406_N$, and an antenna element $408_1$-$408_N$. Transmit (TX) information 410 is input simultaneously into each of the plurality of signal paths via its respective transmitter $402_1$-$402_N$. Transmitter 402 may be any known conventional transmitter. Transmitters $402_1$-$402_N$ modulate and/or frequency up-convert, for example, input TX information 410 using a reference signal 416 from a local oscillator (LO) 414. The outputs of transmitters $402_1$-$402_N$ are power amplified by PA $404_1$-$404_N$, respectively, and then respectively acted upon by variable phase shifters $406_1$-$406_N$. In particular, each variable phase shifter $406_1$-$406_N$ applies a respective phase shift to a respective PA output based on a respective phase shift control signal $412_1$-$412_N$.

To achieve a desired beam steering angle via multi-element antenna array 400, the relative phase shifts between successive antenna elements $408_1$-$408_N$ must be set appropriately. This includes determining a configuration of relative phase shifts between successive antenna elements $408_1$-$408_N$, which results in the desired beam steering angle and controlling variable phase shifters $406_1$-$406_N$ for each signal path, as necessary, to achieve the determined configuration.

Conventional multi-element antenna arrays, including conventional MESA arrays, implement variable phase shifters $406_1$-$406_N$ using time delay phase shifters, vector modulators, and digital phase shifters, for example. The dynamic range and resolution of such phase shifters, however, is limited, which limits the accuracy at which a determined configuration of relative phase shifts can be set. In turn, this limits the accuracy of the resulting beam steering angle of the antenna array and the suitability of the antenna array for certain applications (e.g., high mobility applications). Increasing the number of antenna elements of the array typically allows greater accuracy of beam steering angle but comes with an increased footprint, cost, and power consumption.

4. Energy Converter Based Multi-Element Antenna Array

Embodiments of the present invention provide an energy converter based multi-element antenna array, which will be described below. In an embodiment, the multi-element antenna array is electronically steerable.

Figure 5:
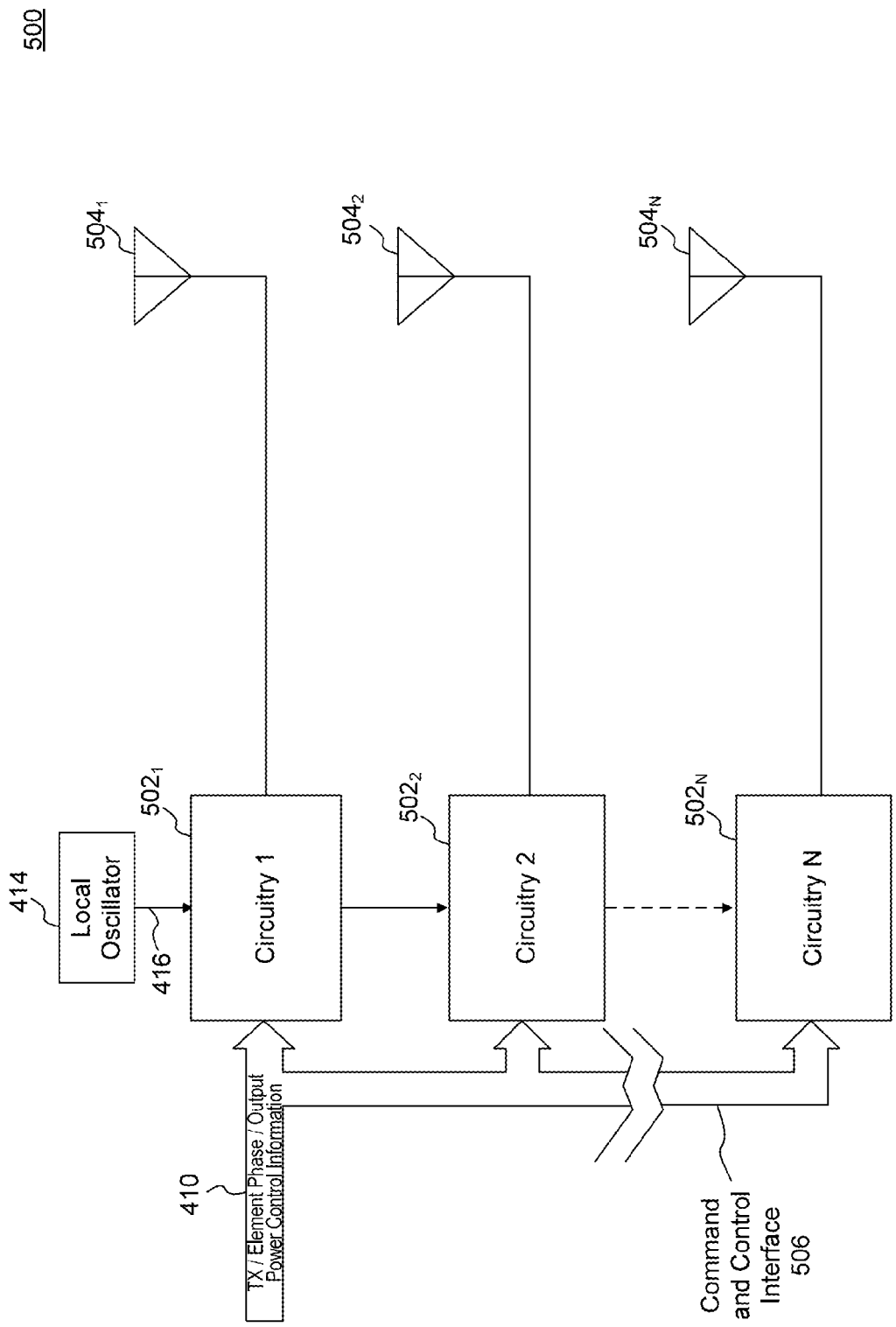
FIG. 5 illustrates an energy converter based multi-element antenna array, according to an embodiment of the present invention.

FIG. 5 illustrates an energy converter based multi-element antenna array 500, according to an embodiment of the present invention. As shown in FIG. 5, energy converter based multi-element transmit antenna array 500 includes a plurality (N) of signal paths, each including an energy converter based transmitter $502_1$-$502_N$ and an antenna element $504_1$-$504_N$. Energy converter based transmitter $502_1$-$502_N$ in each path is provided a reference signal 416 from LO 414 as well as transmit (TX) information, antenna element phase control information, and output power control information, according to an embodiment of the present invention. In an embodiment, the TX information, antenna element phase control information, and the output power control information are provided to each energy converter based transmitter $502_1$-$502_N$ from digital circuitry and/or mixed-signal circuitry that may include, for example, a microprocessor, FPGA, digital signal processor, state machine, or a combination thereof (not shown in FIG. 5).

Accordingly, energy converter based multi-element antenna array embodiments replace, in each signal path, the conventional transmitter, power amplifier, and variable phase shifter (e.g., as used in conventional multi-element transmit antenna array 400 of FIG. 4) with a single energy converter based transmitter. Advantages of an energy converter based multi-element antenna include, among others, significant savings in terms of size, reduction in power consumption, the ability to transmit multiple RF signals, waveforms, and wireless standards with the same energy converter based transmitter circuitry, and enhanced phase and amplitude accuracy for each antenna element.

In addition, embodiments of the present invention leverage various levels of amplitude and/or phase control mechanisms of the energy converter based transmitter to enable both highly-controllable and highly-accurate beam steering in the multi-element antenna array. Indeed, as described above, amplitude and/or phase in an energy converter based transmitter can be controlled at any given time using one or more of multiple stages of the energy converter based transmitter, according to an embodiment of the present invention.

Figure 6:
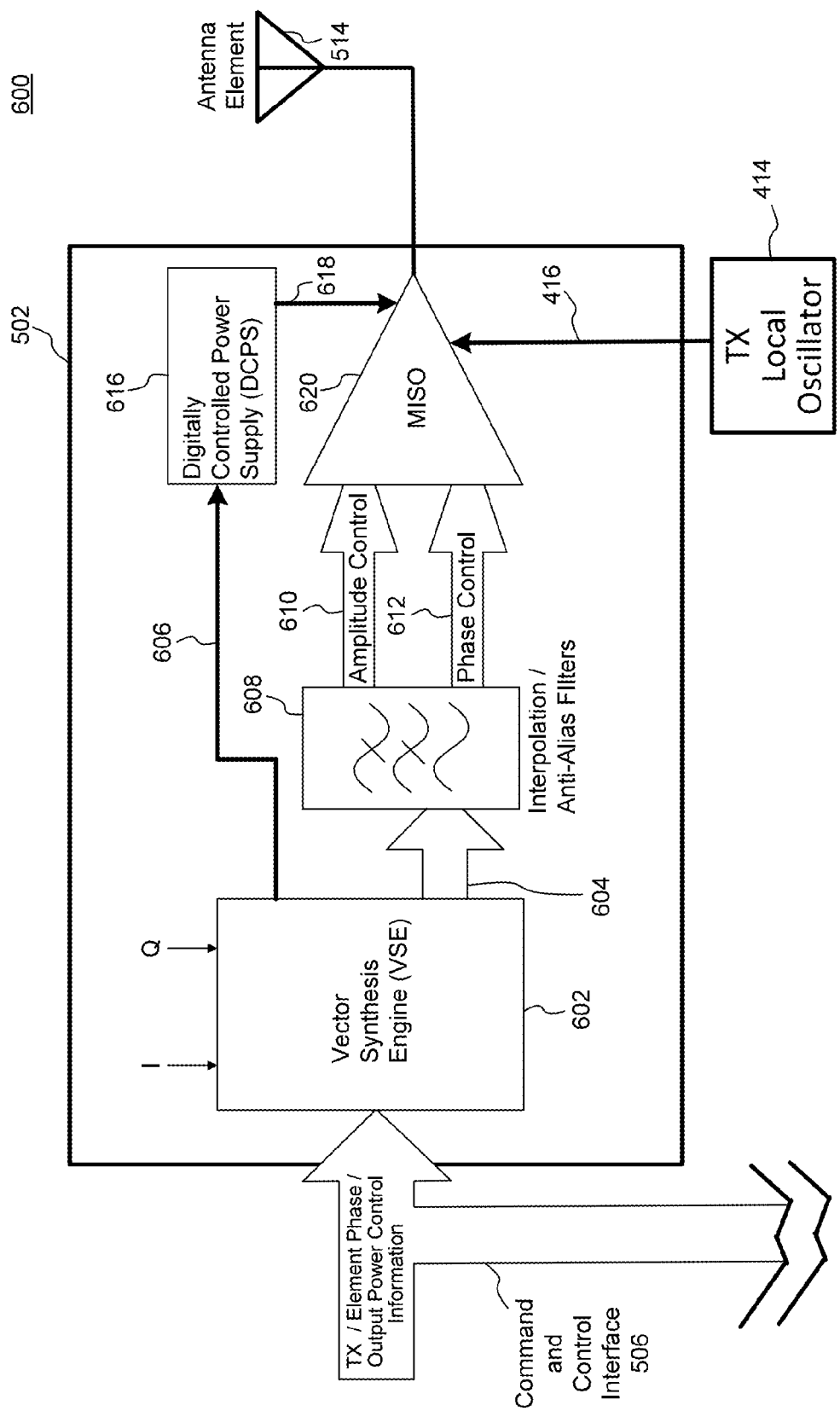
FIG. 6 illustrates an example energy converter based RP transmitter.

FIG. 6 illustrates an example energy converter based transmitter implementation 600, according to an embodiment of the present invention. Embodiments based on example implementation 600 can be used in an energy converter based multi-element antenna array, such as multi-element antenna array 500 of FIG. 5. As shown in FIG. 6, energy converter based transmitter implementation 600 includes a Vector Synthesis Engine (VSE) circuitry 602, a Interpolation/Anti-Alias Filter circuitry 608, a multiple input single output (MISO) operator 620, and a Digitally Controlled Power Supply (DCPS) circuitry 616.

VSE circuitry 602 receives command and control information via a command and control interface 506. In an embodiment, the command and control information is provided by digital and/or mixed-signal circuitry that may include, for example, a microprocessor, FPGA, state machine, or a combination thereof (not shown in FIG. 6) and includes transmit (TX) information, antenna element phase control information, and output power control information. In addition, VSE circuitry 602 receives I and Q information over a data interface, from a baseband processor, for example.

VSE circuitry 602 uses the received I and Q information, element phase, and element power control information to generate amplitude control signals 610, phase control signals 612 (which are filtered by Interpolation/Anti-Alias Filter circuitry 608) and DCPS control signals 606. VSE circuitry 602 and Interpolation/Anti-Alias Filter circuitry 608 provide amplitude control signals 610 and phase control signals 612 to MISO operator 620, and VSE circuitry provides DCPS control signals 606 to DCPS circuitry 616 to generate the desired RF output waveform at the desired amplitude and phase.

Each of amplitude control signals 610, phase control signals 612, filter signal and control interface signals 604, and DCPS control signals 606 can be used, alone or in various combinations, to control the amplitude and/or phase of the output signal of MISO operator 620. In particular, amplitude control signals 610 and phase control signals 612 control the output of MISO operator 620 by controlling various stages of MISO operator 620. Similarly, filter signal and control interface 604 and DCPS control signals 606 control the amplitude and/or phase of the output signal of MISO operator 620 by, respectively, altering the response of Interpolation/Anti-Alias Filter circuitry 608 and controlling the amount of power provided to MISO operator and output storage networks 620.

Further detailed implementations of the energy converter based transmitter are described in U.S. patent application Ser. No. 11/256,172, filed Oct. 24, 2005, now U.S. Pat. No. 7,184,723, U.S. patent application Ser. No. 11/508,989, filed Aug. 24, 2006, now U.S. Pat. No. 7,355,470, and U.S. patent application Ser. No. 12/236,079, filed Sep. 23, 2008, now U.S. Pat. No. 7,911,272, all of which are incorporated herein by reference in their entireties. As detailed in these U.S. patents, amplitude and/or phase control in the energy converter based transmitter can be applied at any given time using at least one of VSE circuitry 602 (also known as the digital control or transfer function module), Interpolation/Anti-Alias Filter circuitry 608, MISO operator 620 (including the vector modulation and output stage), and DCPS circuitry 616 of the energy converter based transmitter. The accuracy of amplitude and/or phase control may further be aided by various circuit and system characterization, circuit and/or system calibration, and/or feed-forward (e.g., pre-compensation)

and/or feedback (e.g., measurement and correction) mechanisms, as described in the above-mentioned U.S. patents.

Together, the various levels of amplitude and/or phase control mechanisms of an energy converter based transmitter can be used, according to embodiments of the present invention, to enable various resolution levels (e.g., accuracy levels) to set the amplitude and/or phase of the energy converter based transmitter. In turn, when the energy converter based transmitter is used in an energy converter based multi-element antenna array, various beam steering (e.g., directivity) accuracy levels can be enabled. For example, depending on the desired beam steering accuracy, one or more of the amplitude/phase control mechanisms in one or more (or in each) energy converter based transmitter of the multi-element antenna array can be used. In addition, by combining multiple control mechanisms, each with a respective control dynamic range, the resulting beam steering accuracy levels include higher accuracy with greater repeatability levels than allowed by using conventional variable phase shifters.

5. MESA-Based Multiple-Input Multiple Output (MIMO) Antenna

Multiple Input Multiple Output (MIMO) antenna operation is often referred to as "spatial multiplexing." Spatial multiplexing refers to a technique that separates one or more high data rate signals into multiple (and sometimes lower) data rate signals, which are then transmitted over different transmit antennas on the same frequency or channel. If the transmit antennas have reasonably different spatial signatures (e.g., the antennas have different polarizations or exist in different planes), a receiver with the same number of receive antennas can process the multiple data rate signals as parallel channels. As such, spatial multiplexing can greatly increase channel capacity. MIMO operation requires at least two antennas but can employ as many antennas as practice allows can be spatially separated.

Figure 7:
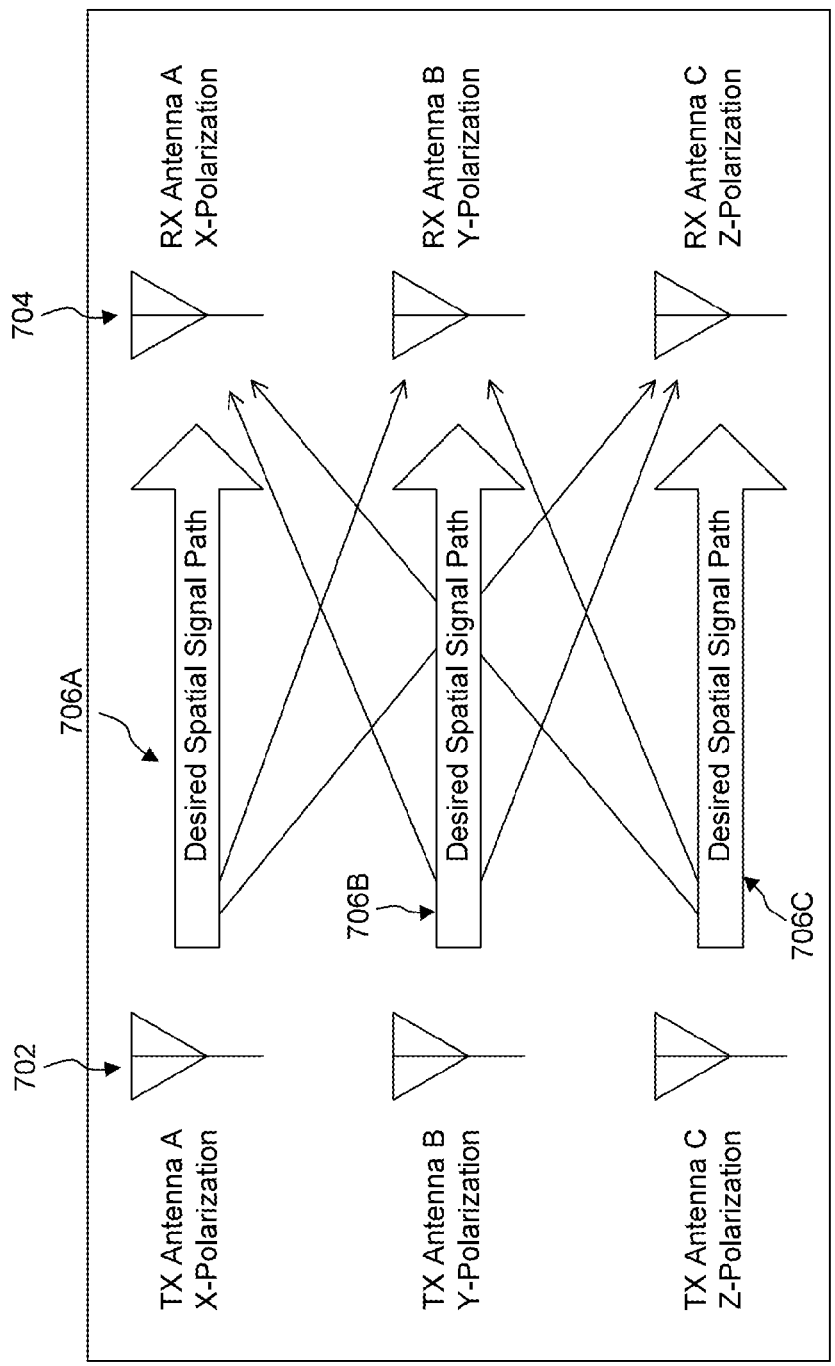
FIG. 7 illustrates an example multiple input multiple output (MIMO) antenna configuration.

FIG. 7 illustrates an example MIMO communication system 700. As shown in FIG. 7, example MIMO communication system 700 includes a MIMO transmit antenna 702 having three transmit (TX) antennas A, B, and C, and a MIMO receive antenna 704 having three receive (RX) antennas A, B, and C. TX antennas A, B, and C have orthogonal polarizations relative to one another (e.g., X-Polarization, Y-Polarization, and Z-Polarization). RX antennas A, B, and C also have orthogonal polarizations relative to one another (e.g., X-Polarization, Y-Polarization, and Z-polarization). In addition, TX antennas A, B, and C and RX antennas A, B, and C are configured so as to have matching polarizations (e.g., TX antenna A and RX antenna A both have X-polarization).

As a result of the above described MIMO antenna configuration, desired spatial signal paths can be created between MIMO transmit antenna 702 and MIMO receive antenna 704. For example, three spatially independent signal paths 706A, 706B, and 706C can be created as shown in FIG. 7. The spatially independent signal paths 706A, 706B, and 706C allow for multiple simultaneous transmissions to occur between MIMO transmit antenna 702 and MIMO receive antenna 704.

As described above, embodiments of the present invention enable a multi-element electronically steerable antenna (MESA) array. The MESA array can be controlled electronically to change its gain, radiation pattern, and/or direction of operation by varying the relative phase shifts and/or amplitudes of the antenna elements of the array. In an embodiment, the MESA array includes at least two antenna elements.

According to an embodiment of the present invention, the MESA array can further be used in a MIMO communication system. As such, in an embodiment, each TX antenna of a MIMO transmit antenna is implemented as one or more MESAs. As a result, each TX antenna can be electronically configured or re-configured for increased and/or optimum performance, according to (or changes in) the environment. For example, the beam width and/or direction of each TX antenna can be electronically changed based on feedback from the MIMO receiver. This can be done, for example, in order to achieve a desired spatial multiplexing, increase the number of MIMO spatial paths, improve the signal to noise ratio of MIMO signals at the receiver, and/or increase spatial isolation between the MIMO spatial paths (e.g., to increase the information data rate or compensate for channel interference).

Thus, embodiments of the present invention enable a MESA-based MIMO transmit antenna configurable to optimize spatial multiplexing system parameters, as desired. Further, according to embodiments of the present invention, a single MESA array can be configured to operate as a MIMO transmit/receive antenna. For example, in an embodiment, the individual elements of a MESA array can be individually configured so as to create therefrom multiple antennas, in which the multiple antennas are configured to form a MINIO antenna.

6. Example Implementations

Example implementations according to embodiments of the present invention will now be provided. These example implementations are provided for the purpose of illustration only, and thus are not limiting. As further described, these example implementations use an energy converter based transmitter and/or an energy sampling based receiver in their designs to enable a RF power transceiver engine for highly accurate, highly efficient multimode wireless applications. Examples of energy converter based transmitters and energy sampling receivers are described the U.S. patents cross-references above, which are incorporated by reference herein in their entireties. For example, as described in at least one of the U.S. patents cross-referenced above, the energy sampling receiver provides an efficient and highly linear solution for demodulating RF waveforms. An energy sampling based receiver provides high sensitivity, high dynamic range, wide instantaneous bandwidth, and a broad tuning range in a compact implementation.

Figure 8:
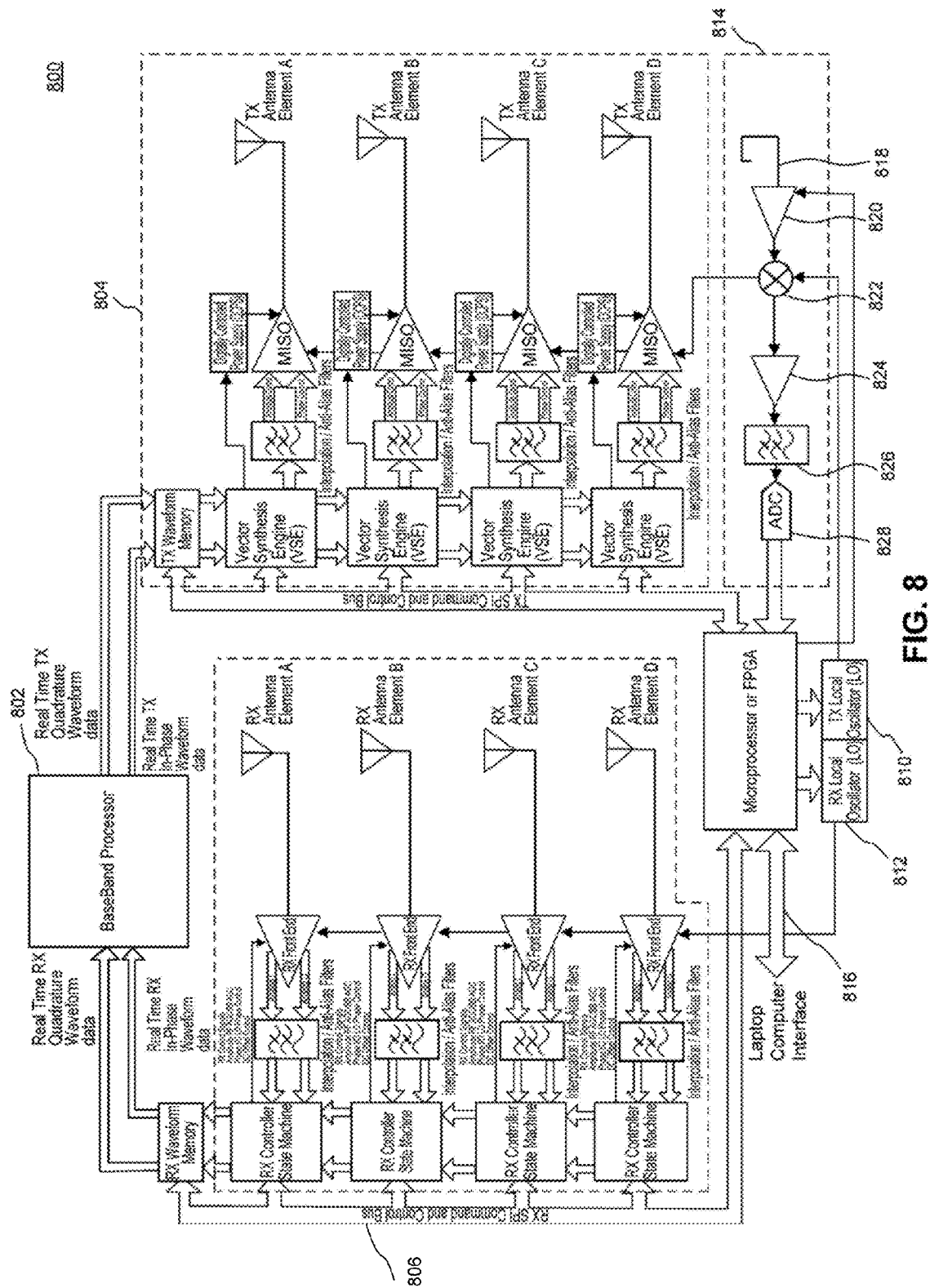
FIG. 8 illustrates an example wireless device having an energy converter based multi-element transmit antenna array and an energy sampling based multi-element receive antenna array, according to an embodiment of the present invention.

FIG. 8 illustrates an example wireless device 800 having an energy converter based multi-element transmit antenna array and an energy sampling based multi-element receive antenna array. Wireless device 800 can support communication in the IEEE L-band (1 to 2 GHz), for example. As shown in FIG. 8, wireless device 800 includes a baseband processor 802, a multi-path transmit section 804, a multi-path receive section 806, a microprocessor or FPGA (Field Programmable Gate Array) processor 808, transmit and receive local oscillators (LOs) 810 and 812, respectively, and a phase and amplitude alignment/calibration receiver path 814.

Baseband processor 802 provides transmit (TX) information to transmit section 804, according to an embodiment of the present invention. The TX information may be in the form of real time in-phase (I) and quadrature (Q) TX waveform data. Additionally, in an embodiment, baseband processor 802 receives receive (RX) information from receive section 806. The RX information may be in the form of real time I and Q waveform data. Additionally, baseband processor 802 may embody the control circuitry, software and/or firmware, and interface(s) found in microprocessor of FPGA processor 808.

Transmit section 804 includes one or more TX signal paths (four in the example of FIG. 8), each including an energy converter based transmitter and an optional TX antenna element. Transmit section 804 receives TX waveform data from baseband processor 802. In an embodiment, transmit section 804 includes a TX waveform memory, which is used for testing purposes. The TX waveform memory can be used to load a desired test waveform and to test the performance of wireless device 800 for the desired test waveform. In an embodiment, the TX waveform memory can be used to test waveforms that are not supported by baseband processor 802. The TX waveform data is provided to the VSE module of each TX signal path, according to an embodiment of the present invention. At the same time, transmit section 804 receives command and control information via a TX SPI (System Packet Interface) bus from microprocessor/FPGA processor 808. TX local oscillator (LO) 810 provides a transmit LO signal to the MISO operator of each TX signal path.

Receive section 806 includes one or more RX signal paths (four in the example of FIG. 8), each including a RX antenna element, a RX front end module, an Interpolation/Anti-Alias Filter stage, and a RX controller. The RX front end module includes an energy sampling based receiver. Receive section 806 provides RX waveform data to baseband processor 802. Like transmit section 804, receive section 806 receives command and control information via a RX SPI bus from microprocessor/FPGA processor 808. RX local oscillator (LO) 812 provides a receive LO to the RX front end module of each RX signal path.

Microprocessor/FPGA processor 808 is programmable via a user computer interface 816, for example, in order to control TX and/or RX sections 804 and 806, respectively, of wireless device 800. According to embodiments of the present invention, microprocessor/FPGA processor 808 can be used to setup, control, calibrate, and test the antenna elements. Microprocessor/FPGA processor 808 may support a graphical user interface, which can be used to download and upload test waveforms and to control individual antenna elements.

Furthermore, microprocessor/FPGA processor 808 receives feedback information from phase and amplitude alignment/calibration receive path 814. In an embodiment, the received feedback information includes information regarding phase alignment and the amplitude or power output of the TX antenna elements.

Phase and amplitude alignment/calibration receive path 814 is used to calibrate the TX antenna elements (e.g., to ensure that the TX antenna elements are operating at a desired phase and power output). In an embodiment, phase and amplitude alignment/calibration receive path 814 includes an antenna (or antenna coupler) 818 and calibration receiver circuitry. The calibration receiver circuitry includes an RF amplifier 820, a frequency down-converter 822, a baseband amplifier 824, interpolation/anti-alias filters 826, and an analog-to-digital (ADC) converter 828. In an embodiment, gain control signal provided by microprocessor/FPGA processor 808 controls the gain of RF amplifier 820.

According to embodiments of the present invention, phase and amplitude alignment/calibration receive path 814 may include more or less components than shown in FIG. 8. For example, as would be understood by a person of skilled in the relevant art based on the teachings herein, the calibration receiver circuitry may be implemented in different ways than shown in FIG. 8. These different implementations of the calibration receiver circuitry are within the spirit and scope of the embodiments disclosed herein.

Figure 9:
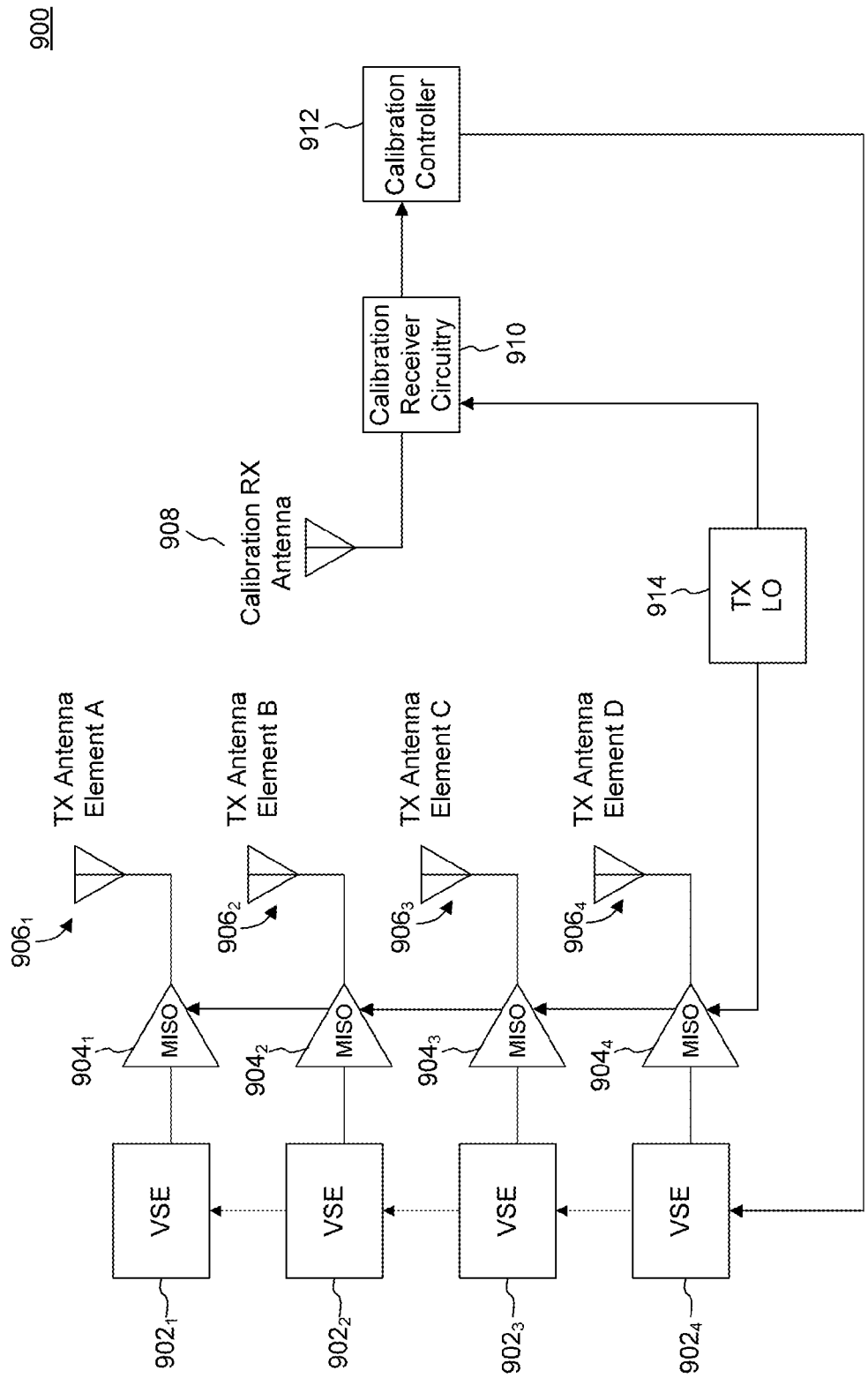
FIG. 9 illustrates an example implementation of a calibration feature of an energy converter based multi-element transmit antenna array, according to an embodiment of the present invention.

FIG. 9 illustrates an example implementation 900 of a phase calibration receive path according to an embodiment of the present invention.

As shown in FIG. 9, the phase and amplitude calibration receive path includes a calibration receiver antenna (or antenna coupler) 908, calibration receiver circuitry 910, and a calibration controller 912. In an embodiment, the calibration receive path serves to calibrate an energy converter based multi-element transmit antenna array. The multi-element transmit antenna array includes a plurality of signal paths, each including a VSE $902_1$-$902_4$, a MISO operator $904_1$-$904_4$, and a TX antenna element $906_1$-$906_4$.

A TX LO 914 provides a local oscillator (LO) signal to each MISO operator $904_1$-$904_4$ as well as to calibration receiver circuitry 910. As a result, a DC signal is generated when a signal transmitted by TX antenna element $906_1$-$906_4$ is received and down-converted by calibration receiver circuitry 910 using the provided LO signal. When TX antennas $906_1$-$906_4$ are substantially equidistant to calibration receiver antenna 908, a substantially equal DC signal value is generated for all TX antennas $906_1$-$906_4$ when TX antennas $906_1$-$906_4$ are phase calibrated. In other words, TX antennas $906_1$-$906_4$ can be phase calibrated by ensuring that the substantially same DC signal value (e.g., a pre-determined value) is generated for all TX antennas (in the case that TX antennas $906_1$-$906_4$ are substantially equidistant to calibration receiver antenna 908 and the same signal is transmitted by TX antennas $906_1$-$906_4$). In addition to phase calibration, calibration controller 912 and calibration receiver circuitry 910 can be used to calibrate the amplitude or power output of each antenna element.

As would be understood by a person skilled in the relevant art, when TX antennas $906_1$-$906_4$ are not substantially equidistant to calibration receiver antenna 908, different DC signal values may result for TX antennas $906_1$-$906_4$. In an embodiment, the generated DC signal value for each TX antenna $906_1$-$906_4$ is normalized using a respective normalization factor (e.g., determined for each TX antenna $906_1$-$906_4$ based on its relative location to calibration receiver antenna 908), and the normalized DC signal values are then used to calibrate TX antennas $906_1$-$906_4$ (e.g., the normalized DC signal values are fixed to the same pre-determined value). Alternatively, in an embodiment, the generated DC signal values are compared against different respective pre-determined DC signal values, where each pre-determined DC signal value is computed a priori for a respective TX antenna $906_1$-$960_4$ using testing and experimentation. This technique can be used to calibrate both amplitude or power output and phase of each antenna element.

Figure 10:
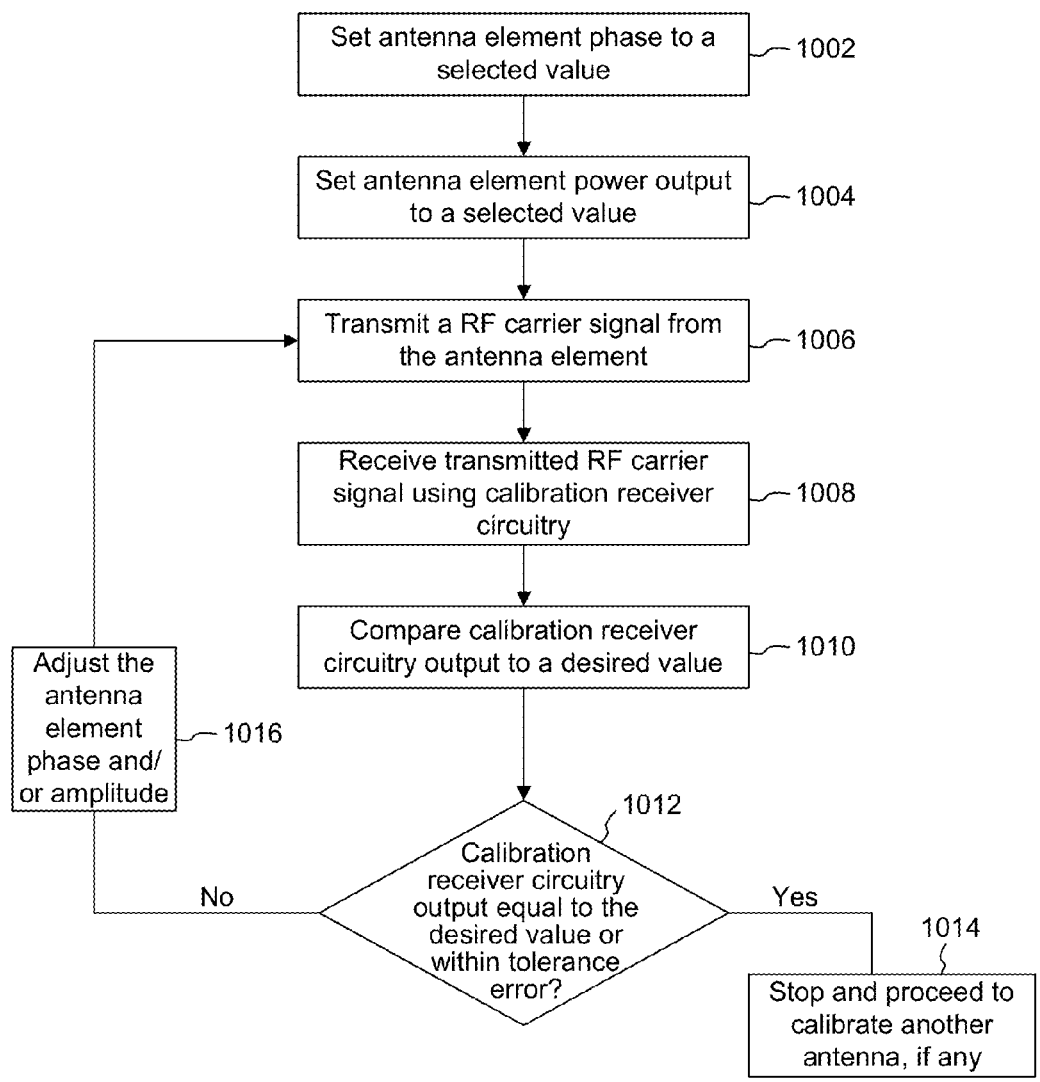
FIG. 10 is a process flowchart of a method for calibrating transmit antenna elements in a multi-element transmit antenna array, according to an embodiment of the present invention.

An example of the operation of the phase and amplitude calibration receive path of FIG. 9 is described with reference to FIG. 10, which illustrates a process flowchart 1000 of a method for calibrating transmit antenna elements in a multi-element transmit antenna array, according to an embodiment of the present invention. Process 1000 is performed with respect to one antenna element at a time—i.e., the antenna element being calibrated.

Process 1000 begins in step 1002, which includes setting the phase of an antenna element being calibrated to a selected value. In an embodiment, step 1002 is performed using one or more of calibration controller 912, VSE 902, and MISO operator 904 of FIG. 9. For example, the phase of the antenna element may be set to a value corresponding to 0 degrees relative to a reference.

Step 1004 includes setting the power output of the antenna element being calibrated to a selected value. In an embodiment, step 1004 is performed using one or more of calibration controller 912, VSE 902, and MISO operator 904 of FIG. 9. The selected power output value is selected, in an embodiment, based on the distance of the antenna element being calibrated to the calibration receiver antenna.

Step 1006 includes transmitting an RF carrier signal from the antenna element. The RF carrier signal is transmitted at the selected phase value and the selected power output value. The RF carrier signal can be any RF signal. In an embodiment, step 1006 is performed using one or more of VSE 902, MISO operator 904, and TX antenna element 906 of FIG. 9.

Step 1008 includes receiving the transmitted RF carrier signal using the calibration receiver circuitry. Step 1008 is performed by calibration receiver circuitry 910 of FIG. 9, according to an embodiment of the present invention. In an embodiment, step 1008 includes down-converting the transmitted RF carrier signal using the same LO signal used to generate the transmitted RF carrier signal. As a result, as described above, a DC signal is generated in step 1008.

Step 1010 includes comparing an output of the calibration receiver circuitry to a desired value or range of values. In an embodiment, step 1010 is performed by calibration controller 912 of FIG. 9. n an embodiment, step 1010 includes comparing the DC signal generated in step 1008 with a desired pre-determined DC signal value. As described above, the desired DC signal value may be the same value for all antennas, or can be computed for each antenna a priori using testing and experimentation. In an embodiment, the output of the calibration receiver circuitry may be an analog or a digital signal.

Step 1012 includes determining whether or not the output of the calibration receiver circuitry is equal to the desired value or within a defined tolerance error from the desired value. If the result of step 1012 is "Yes," then calibration process 1000 proceeds to step 1014, which ends the calibration process for the antenna element being calibrated. Process 1000 can be repeated for another antenna element, if any. Otherwise, process 1000 proceeds to step 1016, which includes adjusting the phase and/or amplitude of the antenna element. In an embodiment, step 1016 includes adjusting the phase and/or amplitude of the antenna element based on a comparison of the output of the calibration receiver circuitry and the desired value or range of values. The phase and/or amplitude of the antenna element is adjusted so as to bring the output of the calibration receiver circuitry closer to the desired value and within the defined tolerance error from the desired value.

As described above, when all TX antenna elements are substantially equidistant to the calibration receiver antenna or antenna coupling circuitry, the TX antenna elements are all calibrated to a substantially similar desired value. However, in the case that the TX antennas are placed in a non-symmetrical layout relative to the calibration receiver antenna, then the TX antenna elements may have to be calibrated to different desired values.

The phase and amplitude calibration techniques described herein can be performed prior to the example implementation operation and/or during the example implementation operation. In an embodiment, the phase and amplitude calibration can occur during a set-up process or procedure, at regular time intervals, or in the event of a measured or observed error (e.g., at a time which does not interfere with normal operation of the transceiver).

FIGS. 11A-11D illustrate example configurations of a multi-element electronically steerable antenna (MESA) according to embodiments of the present invention. In particular, FIGS. 11A and B illustrate example layouts of TX antenna elements relative to the calibration receiver antenna or antenna coupler in MESA embodiments of the present invention.

Figure 11A:
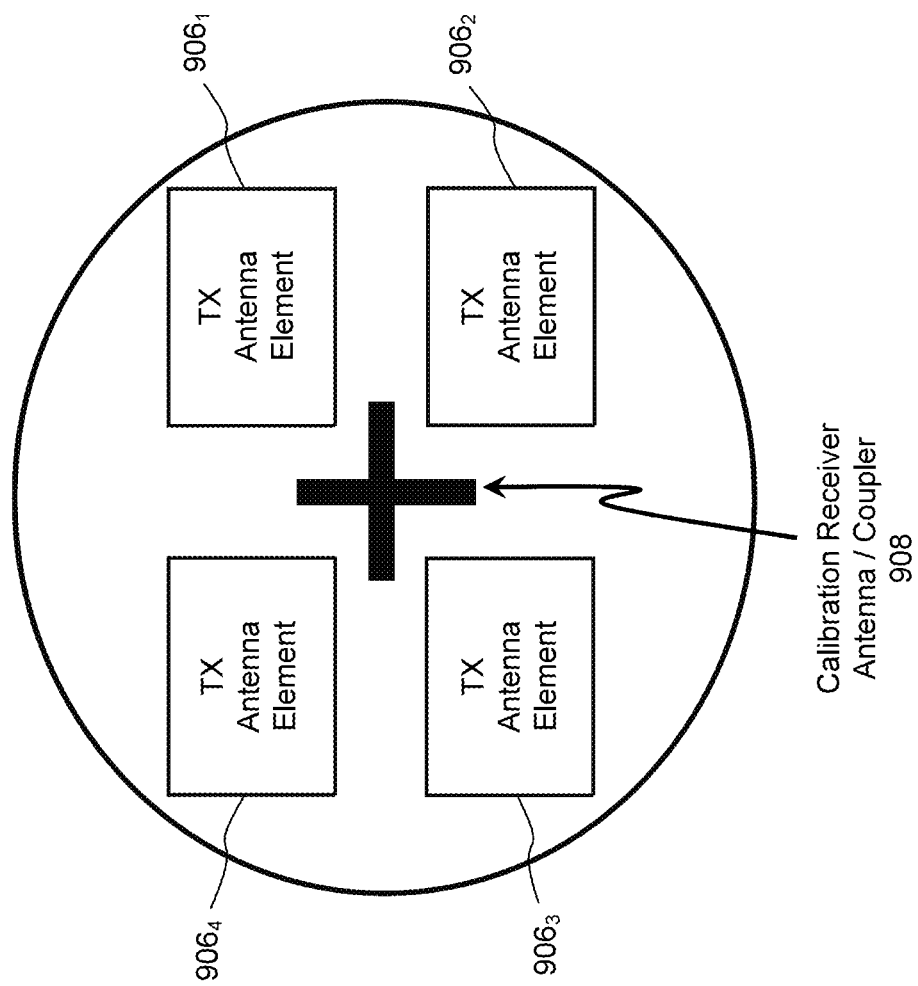
FIGS. 11A-11D illustrate example configurations of a multi-element electronically steerable antenna (MESA), according to embodiments of the present invention.

FIG. 11A illustrates an example four-element MESA configuration 1100A, according to an embodiment of the present invention. Example configuration 1100A has a symmetrical layout, in which TX antenna elements $906_1$, $906_2$, $906_3$, and $906_4$ are placed symmetrically relative to calibration receiver antenna/coupler 908. Thus, TX antenna elements $906_1$-$906_4$ are pairwise equidistant to calibration receiver antenna/coupler 908, and can be calibrated to the same desired value.

Figure 11B:
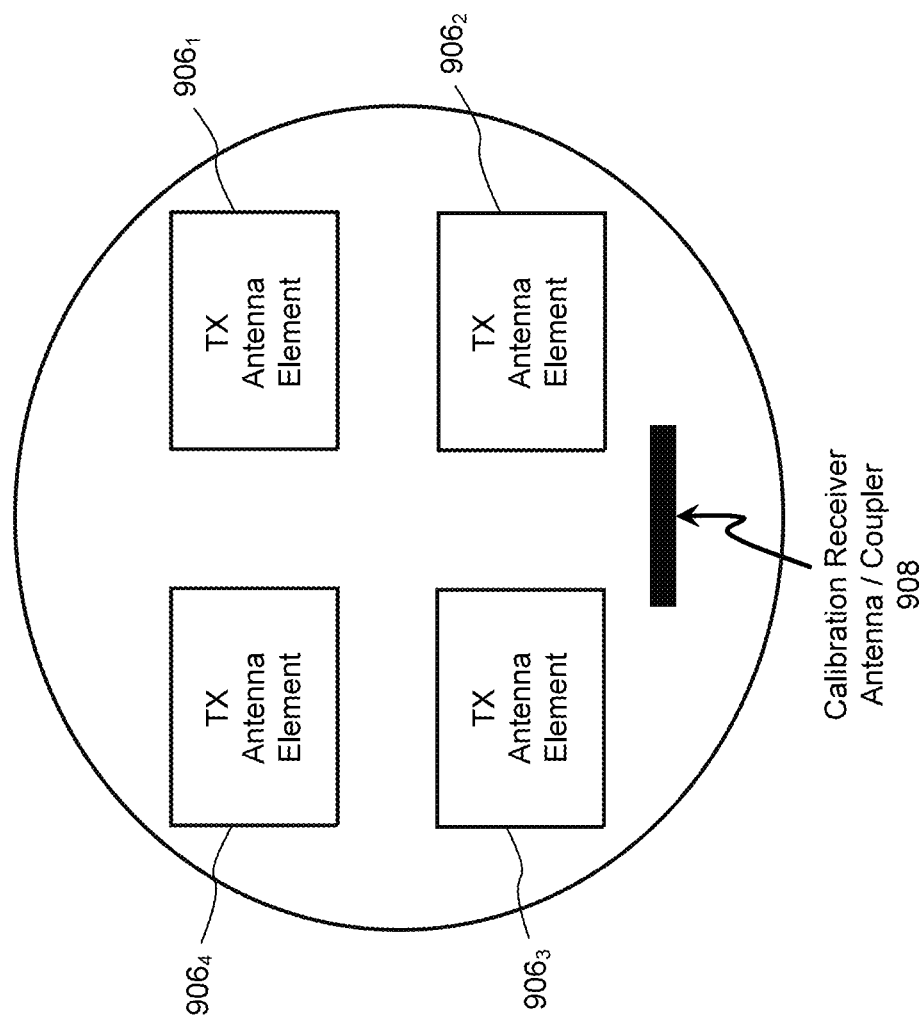

FIG. 11B illustrates another example four-element MESA configuration 1100B, according to an embodiment of the present invention. Example configuration 1100B has a layout whereby the calibration receiver antenna or antenna coupler 908 is not substantially equidistant relative to each antenna element. In particular, TX antenna elements $906_1$-$906_4$ are not pairwise equidistant to calibration receiver antenna/coupler 908. Instead, TX antenna elements $906_1$ and $906_4$ are equidistant to calibration receiver antenna/coupler 908 (but not equidistant with TX antenna elements $906_2$ and $906_3$). Similarly, TX antenna elements $906_2$ and $906_3$ are equidistant to calibration receiver antenna/coupler 908 (but not equidistant with TX antenna elements $906_1$ and $906_4$). As such, TX antenna elements $906_1$ and $906_4$ can be calibrated to a first desired value, and TX antenna elements $906_2$ and $906_3$ can be calibrated to a second desired value or, alternatively, all antenna elements can be calibrated to different, predetermined values.

Figure 11C:
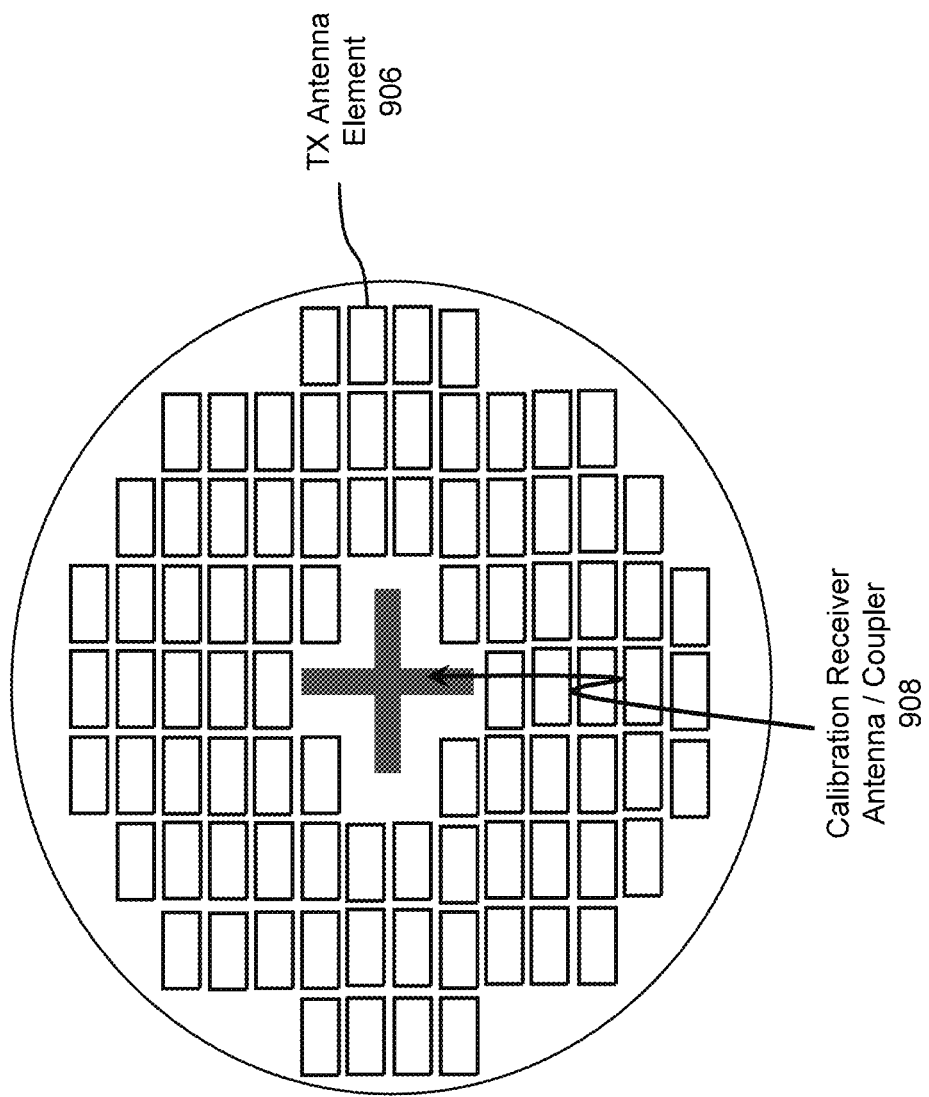

FIG. 11C illustrates another example MESA configuration 1100C, according to an embodiment of the present invention. Example configuration 1100C may include any number of TX antenna elements 906, placed around calibration receiver antenna/coupler 908. Accordingly, depending on its location and distance from calibration receiver antenna/coupler 908, a TX antenna element 906 may be equidistant and/or symmetric to one or more other TX antenna elements of the configuration.

Figure 11D:
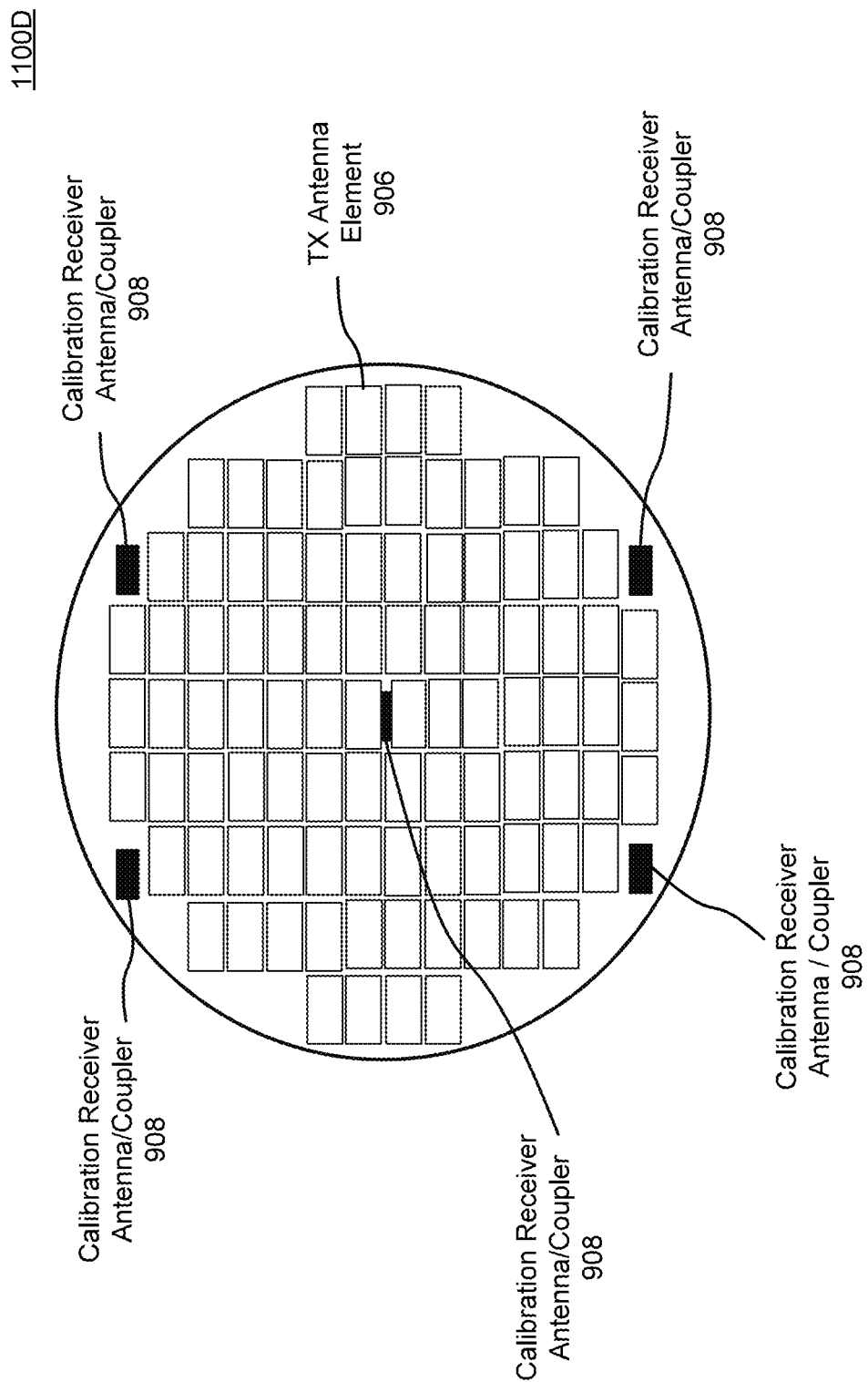

FIG. 11D illustrates another example MESA configuration 1100D according to an embodiment of the present invention. Example configuration 1100D may include any number of TX antenna elements 906, placed around or near one or more calibration receiver antenna/couplers 908. In an embodiment, calibration of MESA configuration 1100D is performed by dividing the set of antenna elements 906 into sub-sets, calibrating the antennas in each sub-set using the additional calibration receiver antenna/couplers 908 co-located near the sub-set, and then calibrating the sub-sets relative to each other using calibration receiver and calibration control circuitry configured to accept one or more calibration receiver antenna/coupler inputs.

In an embodiment, calibrating the sub-sets relative to each other can be done by selecting a single representative TX antenna element from each sub-set, calibrating the selected TX antenna elements using calibration receiver antenna/coupler 908, and then applying the calibration result of each representative TX antenna element to all other antenna elements of its respective sub-set. In an embodiment, this calibration technique may require predictably-characterized offset parameters.

Based on the description herein, a person skilled in the relevant art will recognize that similar phase and amplitude calibration techniques (as described above) can be used to calibrate one or more elements in a receive signal path.

7. Example Systems

Embodiments of the present invention, as described above, are suitable for use in various communication applications including, but not limited to, military communication applications, wireless local area networks (WLAN) applications, cellular phone applications (e.g., in base stations, handsets, etc.), picocell applications, femtocell applications, and automobile applications. In particular, MESA based MIMO antenna embodiments are suitable for use in a Long Term Evolution (LTE) based communication system (which is part of the 4G Enhanced Packet System (EPS) standard), and can be used to optimize the system's data throughput, user capacity, and performance (e.g., signal to noise ratios) in any static or dynamic environment.

Figure 12:
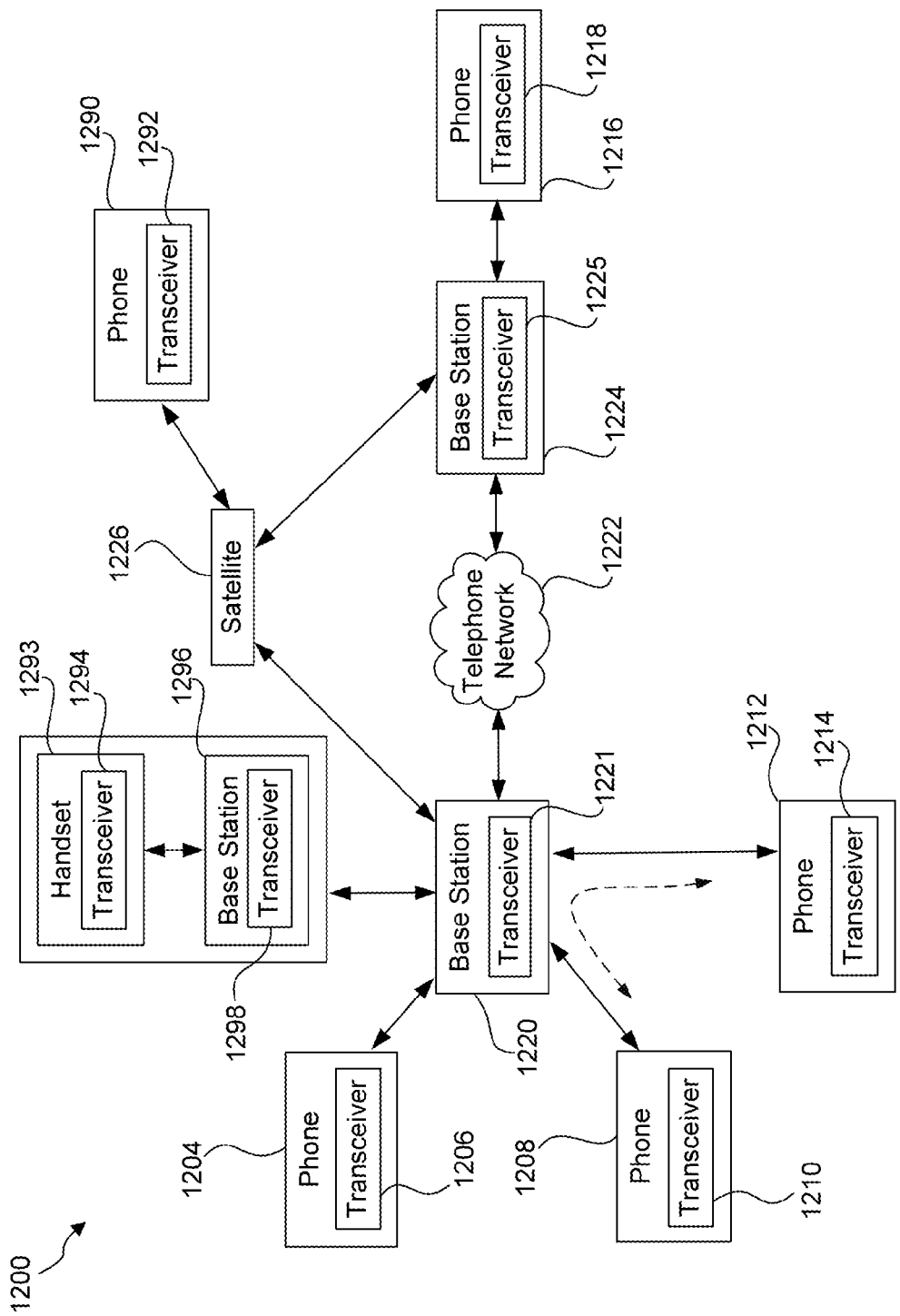
FIG. 12 illustrates an example mobile device communication system in which embodiments of the present invention can be implemented.

FIG. 12 illustrates an example mobile device communication system 1200 in which embodiments of the present invention can be implemented. System 1200 can be, for example, a cellular phone system (e.g., 3G, 4G, or any other type of wireless communication system) and satellite phone system. Cellular phones 1204, 1208, 1212, and 1216 each include a transceiver 1206, 1210, 1214, and 1218, respectively. Transceivers 1206, 1210, 1214, and 1218 enable their respective cellular phones to communicate via a wireless communication medium (e.g., 3G, 4G, or any other type of wireless communication system) with base stations 1220 and 1224. Base stations 1220 and 1224 are in communication with one another via a telephone network 1222 and include transceivers 1221 and 1225, respectively. According to an embodiment of the present invention, transceivers 1206, 1210, 1214, 1218, 1221, and 1225 are implemented using one or more energy converter based transmitters (e.g., as described above with respect to FIG. 6), one or more MIMO antennas (e.g., as described above with respect to FIG. 7), one or more transceivers with an energy converter based multi-element transmit antenna array and an energy sampling based multi-element receive antenna array (e.g., as described above with respect to FIG. 8), or a combination thereof.

Based on the description herein, a person skilled in the relevant art will recognize that other types of base stations can include the transceivers discussed above. The other types of base stations include, but are not limited to, macro base stations (operating in networks that are relatively large), micro base stations (operating in networks that are relatively small), satellite base stations (operating with satellites), cellular base stations (operating in a cellular telephone networks), and data communication base stations (operating as gateways to computer networks).

FIG. 12 also illustrates a satellite telephone 1290 that communicates via satellites, such as satellite 1226. Satellite telephone 1290 includes a transceiver 1292, which can be implemented using one or more energy converter based transmitters (e.g., as described above with respect to FIG. 6), one or more MIMO antennas (e.g., as described above with respect to FIG. 7), one or more transceivers with an energy converter based multi-element transmit antenna array and an energy sampling based multi-element receive antenna array (e.g., as described above with respect to FIG. 8), or a combination thereof.

FIG. 12 also illustrates a cordless phone 1290 having a handset 1293 and a base station 1296. Handset 1293 and base station 1296 include transceivers 1294 and 1298, respectively, for communicating with each other preferably over a wireless link. Transceivers 1294 and 1298 are preferably implemented using one or more energy converter based transmitters (e.g., as described above with respect to FIG. 6), one or more MIMO antennas (e.g., as described above with respect to FIG. 7), one or more transceivers with an energy converter based multi-element transmit antenna array and an energy sampling based multi-element receive antenna array (e.g., as described above with respect to FIG. 8), or a combination thereof.

Advantages of implementing embodiments of the present invention into, for example, the above-noted systems include but are not limited to signal range and quality improvement, increased communication bandwidth, increased capacity, rapid antenna directionality without the use of mechanical movement, and reduction in power consumption. Additional advantages include smaller form factors, enhanced reliability, enhanced repeatability, electronically-controlled antenna gain, beam width, beam shape, beam steering, electronic calibration, and electronic signal acquisition and tracking.

8. Conclusion

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventors, and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention such that others can, by applying knowledge within the skill of the relevant art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. An apparatus comprising:
a synthesis engine configured to generate amplitude control signals, phase control signals and power supply control signals based on command and control information;
a power supply configured to receive the power supply control signals and to generate a power supply signal;
a multiple input single output (MISO) operator configured to generate an output signal with an amplitude or a phase controlled by at least one of the amplitude control signals, the phase control signals and the power supply signal; and
an interpolation/anti-alias filter configured to filter the amplitude control signals and the phase control signals prior to reception by the MISO operator.

2. The apparatus of claim 1, wherein the synthesis engine is configured to generate at least one of the amplitude control signals, the phase control signals and the power supply control signals based on at least one of in-phase (I) and quadrature-phase information, element phase and element power control information.

3. The apparatus of claim 1, wherein the command and control information comprises at least one of transmit information, antenna element phase control information and output power control information.

4. The apparatus of claim 1, wherein the power supply comprises a digitally-controlled power supply.

5. The apparatus of claim 1, wherein the power supply is configured to control the amplitude or the phase of the output signal by controlling an amount of power provided to the MISO operator.

6. The apparatus of claim 1, wherein the amplitude and the phase of the output signal is based on the power supply signal.

7. A method comprising:
generating amplitude control signals, phase control signals and power supply control signals based on command and control information;
receiving the power supply control signals to generate a power supply signal;
generating, with a multiple input single output (MISO) operator, an output signal with an amplitude or a phase controlled by at least one of the amplitude control signals, the phase control signals and the power supply signal; and
filtering the amplitude control signals and the phase control signals prior to reception by the MISO operator.

8. The method of claim 7, wherein the generating the amplitude control signals, the phase control signals and the power supply control signals comprises generating at least one of the amplitude control signals, the phase control signals and the power supply control signals based on at least one of in-phase (I) and quadrature-phase information, element phase and element power control information.

9. The method of claim 7, wherein the receiving comprises controlling the amplitude or the phase of the output signal by controlling an amount of power provided to the MISO operator.

10. The method of claim 7, wherein the generating the output signal comprises generating the amplitude and the phase of the output signal based on the power supply signal.

11. A system comprising:
an energy converter comprising:
  a synthesis engine configured to generate amplitude control signals, phase control signals and power supply control signals based on command and control information;
  a power supply configured to receive the power supply control signals and to generate a power supply signal; and
  a multiple input single output (MISO) operator configured to generate an ouput signal with an amplitude or phase controlled by at least one of the amplitude control signals, the phase control signals and the power supply signal;
a local oscillator configured to provide a reference signal to the energy converter;
interpolation/anti-alias filter configured to filter the amplitude control signals and the phase control signals prior to the reception by the MISO operator; and
an antenna configured to transmit the output signal.

12. The system of claim 11, wherein the synthesis engine is configured to generate at least one of the amplitude control signals, the phase control signals and the power supply control signals based on at least one of in-phase (I) and quadrature-phase information, element phase and element power control information.

13. The system of claim 11, wherein the command and control information comprises at least one of transmit information, antenna element phase control information and output power control information.

14. The system of claim 11, wherein the power supply is comprises a digitally-controlled power supply.

15. The system of claim 11, wherein the power supply is configured to control the amplitude or the phase of the output signal by controlling an amount of power provided to the MISO operator.

16. The system of claim 11, wherein the amplitude and the phase of the output signal is based on the power supply signal.

17. system comprising:
an energy converter comprising:
  a synthesis engine configured to generate amplitude control signals, phase control signals and power supply control signals based on command and control information;
  a power supply configured to receive the power supply control signals and to generate a power supply signal; and
  a multiple input single output (MISO) operator configured to generate an ouput signal with an amplitude or phase controlled by at least one of the amplitude control signals, the phase control signals and the power supply signal;
a local oscillator configured to provide a reference signal to the energy converter wherein the local oscillator configured to provide the reference signal to the MISO operator; and
an antenna configured to transmit the output signal.

* * * * *